United States Patent
Yum et al.

(10) Patent No.: US 11,075,678 B2
(45) Date of Patent: Jul. 27, 2021

(54) METHOD FOR REPORTING CHANNEL STATE BY USING APERIODIC CHANNEL STATE INFORMATION-REFERENCE SIGNAL, AND DEVICE THEREFOR

(71) Applicant: LG ELECTRONICS INC., Seoul (KR)

(72) Inventors: Kunil Yum, Seoul (KR); Kijun Kim, Seoul (KR); Jonghyun Park, Seoul (KR); Hyungtae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 351 days.

(21) Appl. No.: 16/089,884

(22) PCT Filed: Mar. 23, 2017

(86) PCT No.: PCT/KR2017/003144
§ 371 (c)(1),
(2) Date: Sep. 28, 2018

(87) PCT Pub. No.: WO2017/171307
PCT Pub. Date: Oct. 5, 2017

(65) Prior Publication Data
US 2020/0304192 A1   Sep. 24, 2020

Related U.S. Application Data

(60) Provisional application No. 62/316,553, filed on Mar. 31, 2016, provisional application No. 62/326,825, (Continued)

(51) Int. Cl.
*H04L 1/00* (2006.01)
*H04B 7/06* (2006.01)
(Continued)

(52) U.S. Cl.
CPC ......... *H04B 7/0626* (2013.01); *H04L 1/0013* (2013.01); *H04L 1/0067* (2013.01);
(Continued)

(58) Field of Classification Search
CPC ... H04B 7/0626; H04L 1/0013; H04L 1/0067; H04L 1/0069
See application file for complete search history.

(56) References Cited

U.S. PATENT DOCUMENTS

| | | | |
|---|---|---|---|
| 2013/0301549 A1* | 11/2013 | Chen | H04B 7/024 370/329 |
| 2015/0244444 A1 | 8/2015 | Mazzarese et al. | |
| 2016/0227548 A1* | 8/2016 | Nimbalker | H04L 5/0051 |

FOREIGN PATENT DOCUMENTS

| | | |
|---|---|---|
| WO | 2014157786 | 10/2014 |
| WO | 2016036097 | 3/2016 |

OTHER PUBLICATIONS

PCT International Application No. PCT/KR2017/003144, Written Opinion of the International Searching Authority dated Jun. 27, 2017, 20 pages.

(Continued)

*Primary Examiner* — Salvador E Rivas
(74) *Attorney, Agent, or Firm* — Lee, Hong, Degerman, Kang & Waimey PC

(57) ABSTRACT

The present invention relates to a method for receiving a downlink signal in a wireless communication system. The method, according to one embodiment of the present invention, is performed by a terminal and may comprise the steps of: receiving control information indicating an aperiodic channel state information-reference signal (CSI-RS) resource masked with an identifier associated with an aperiodic CSI-RS; if the control information does not indicate an aperiodic CSI-RS resource for each terminal in a cell, determining that the aperiodic CSI-RS resource indicated by (Continued)

the control information is a resource element (RE) puncturing pattern for a downlink data channel or an improved downlink control channel; and decoding the downlink data channel or the improved downlink control channel by using the RE puncturing pattern.

6 Claims, 10 Drawing Sheets

Related U.S. Application Data filed on Apr. 24, 2016, provisional application No. 62/339,941, filed on May 22, 2016, provisional application No. 62/376,897, filed on Aug. 18, 2016, provisional application No. 62/379,220, filed on Aug. 24, 2016.

(51) Int. Cl.
*H04L 5/00* (2006.01)
*H04W 72/04* (2009.01)

(52) U.S. Cl.
CPC .......... *H04L 1/0069* (2013.01); *H04L 5/0051* (2013.01); *H04W 72/042* (2013.01)

(56) References Cited

OTHER PUBLICATIONS

Qualcomm, "Beamformed CSI-RS design for CSI reporting class B", 3GPP TSG RAN WG1 Meeting #82bis, R1-155736, Oct. 2015, 4 pages.
LG Electronics, "Beamformed CSI-RS related enhancements based on the identified approaches", 3GPP TSG RAN WG1 Meeting #82, R1-154274, Aug. 2015, 7 pages.

* cited by examiner

METHOD FOR REPORTING CHANNEL STATE BY USING APERIODIC CHANNEL STATE INFORMATION-REFERENCE SIGNAL, AND DEVICE THEREFOR

CROSS-REFERENCE TO RELATED APPLICATIONS

This application is the National Stage filing under 35 U.S.C. 371 of International Application No. PCT/KR2017/003144, filed on Mar. 23, 2017, which claims the benefit of U.S. Provisional Application No. 62/316,553, filed on Mar. 31, 2016, 62/326,825, filed on Apr. 24, 2016, 62/339,941, filed on May 22, 2016, 62/376,897, filed on Aug. 18, 2016, and 62/379,220, filed on Aug. 24, 2016, the contents of which are all hereby incorporated by reference herein in their entireties.

TECHNICAL FIELD

The present invention relates to a wireless communication system, and more particularly, to a method for reporting a channel state using an aperiodic channel state information-reference signal, and a device therefor.

BACKGROUND ART

An antenna system for constructing an antenna array in two dimensions has been introduced. The multiple-input multiple-output scheme using such a two-dimensional antenna system is referred to as full dimension (FD)-MIMO. In FD-MIMO scheme, the number of antenna ports is greatly increased over the conventional cases, and therefore overhead of reference signals for channel estimation also increases. In this regard, an aperiodic channel state information-reference signal has been proposed and the present invention is intended to address a relevant issue.

DISCLOSURE

Technical Problem

An object of the present invention to provide a method for reporting a channel state based on an aperiodic channel state information-reference signal.

It will be appreciated by persons skilled in the art that the objects that could be achieved with the present invention are not limited to what has been particularly described hereinabove and other objects that the present invention could achieve will be more clearly understood from the following detailed description.

Technical Solution

The object of the present invention can be achieved by providing a method for receiving a downlink signal in a wireless communication system, the method being performed by a terminal, the method including receiving control information indicating an aperiodic channel state information-reference signal (CSI-RS) resource, the control information being masked with an aperiodic CSI-RS-related identifier, determining that the aperiodic CSI-RS resource indicated by the control information is a resource element (RE) puncturing pattern for a downlink data channel or an enhanced downlink control channel when the control information does not indicate an aperiodic CSI-RS resource for each terminal in a cell, and decoding the downlink data channel or the enhanced downlink control channel using the RE puncturing pattern.

Alternatively or alternatively, the method may further include receiving information indicating an aperiodic CSI-RS resource for the terminal through separate control information when the control information does not indicate the aperiodic CSI-RS resource for each terminal in the cell.

Alternatively or alternatively, the method may further include measuring the aperiodic CSI-RS on the aperiodic CSI-RS resource for the terminal when the control information indicates the aperiodic CSI-RS resource for each terminal in the cell.

Alternatively or alternatively, aperiodic CSI-RS resources for terminals other than the terminal may be used for rate matching for decoding of the downlink data channel or the enhanced downlink control channel when the control information indicates the aperiodic CSI-RS resource for each terminal in the cell.

Alternatively or alternatively, the control information may be received in a terminal-specific search space.

Alternatively or alternatively, the control information may be received in a control information candidate of a predetermined minimum aggregation level.

Alternatively or alternatively, the control information may be received in downlink control information of a predetermined format.

Alternatively or alternatively, the control information may be received on a downlink control channel excluding the enhanced downlink control channel.

Alternatively or alternatively, the control information may be received on the enhanced downlink control channel.

Alternatively or alternatively, the method may further include receiving information indicating a time at which aperiodic CSI according to the control information is transmitted when the control information is received on the enhanced downlink control channel.

Alternatively or alternatively, the time (subframe #n+p) at which the aperiodic CSI is transmitted may be different from a time at which aperiodic CSI is transmitted (subframe #n+q) when the control information is received on the downlink control channel, wherein p may be a positive integer greater than q.

Alternatively or alternatively, the time at which the aperiodic CSI is transmitted may be different from a time at which uplink data indicated by the control information is transmitted.

Alternatively or alternatively, an uplink resource on which the aperiodic CSI is transmitted may be predefined.

In another aspect of the present invention, provided herein is a terminal configured to receive a downlink signal in a wireless communication system, the terminal including a transmitter and a receiver, and a processor that controls the transmitter and the receiver, wherein the processor receives control information indicating an aperiodic channel state information-reference signal (CSI-RS) resource, the control information being masked with an aperiodic CSI-RS-related identifier, to determine that the aperiodic CSI-RS resource indicated by the control information is a resource element (RE) puncturing pattern for a downlink data channel or an enhanced downlink control channel when the control information does not indicate an aperiodic CSI-RS resource for each terminal in a cell, and to decode the downlink data channel or the enhanced downlink control channel using the RE puncturing pattern.

The above-described aspects of the present invention are merely a part of embodiments of the present invention.

Those skilled in the art will derive and understand various embodiments reflecting the technical features of the present invention from the following detailed description of the present invention.

Advantageous Effects

According to embodiments of the present invention, a channel state report according to a periodic channel state report-reference signal may be efficiently processed according to increase in the number of antenna ports.

It will be appreciated by those skilled in the art that that the effects that may be achieved through the embodiments of the present invention are not limited to those described above and other advantages of the present invention will be more clearly understood from the following detailed description.

DESCRIPTION OF DRAWINGS

The accompanying drawings, which are included to provide a further understanding of the invention and are incorporated in and constitute a part of this application, illustrate embodiments of the invention and, together with the description, serve to explain the principles of the invention.

BEST MODE

Figure 1:
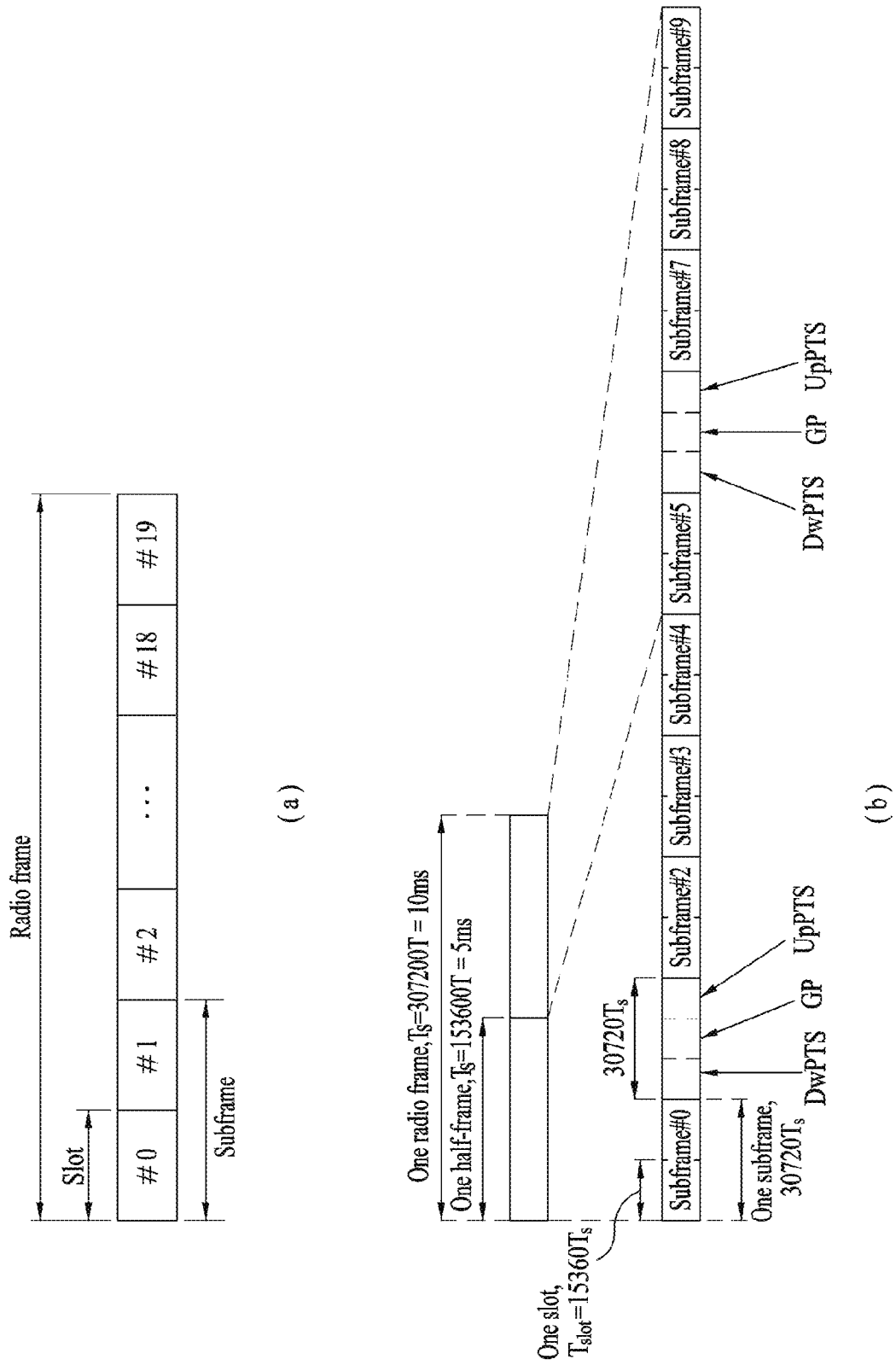
FIG. 1 illustrates an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e., single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to multiple nodes may control the nodes such that signals are simultaneously transmitted to or received from a UE through some or all nodes. While there is a difference between multi-node systems according to the nature of each node and implementation form of each node, multi-node systems are discriminated from single node systems (e.g., a centralized antenna system (CAS), conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes may be applied to various types of multi-node systems. For example, a node refers to an antenna group spaced apart from another node by a predetermined distance or more, in general. However, embodiments of the present invention, which will be described below, may even be applied to a case in which a node refers to an arbitrary antenna group irrespective of node interval. In the case of an eNB including an X-pole (cross-polarized) antenna, for example, the embodiments of the preset invention are applicable on the assumption that the eNB controls a node composed of an H-pole antenna and a node composed of a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$  | 2192 · $T_s$ | 2560 · $T_s$ | 7680 · $T_s$  | 2192 · $T_s$ | 2560 · $T_s$ |
| 1 | 19760 · $T_s$ |              |              | 20480 · $T_s$ |              |              |
| 2 | 21952 · $T_s$ |              |              | 23040 · $T_s$ |              |              |
| 3 | 24144 · $T_s$ |              |              | 25600 · $T_s$ |              |              |
| 4 | 26336 · $T_s$ |              |              | 7680 · $T_s$  | 4384 · $T_s$ | 5120 · $T_s$ |
| 5 | 6592 · $T_s$  | 4384 · $T_s$ | 5120 · $T_s$ | 20480 · $T_s$ |              |              |
| 6 | 19760 · $T_s$ |              |              | 23040 · $T_s$ |              |              |
| 7 | 21952 · $T_s$ |              |              | 12800 · $T_s$ |              |              |
| 8 | 24144 · $T_s$ |              |              | —             | —            | —            |
| 9 | 13168 · $T_s$ |              |              | —             | —            | —            |

Figure 2:
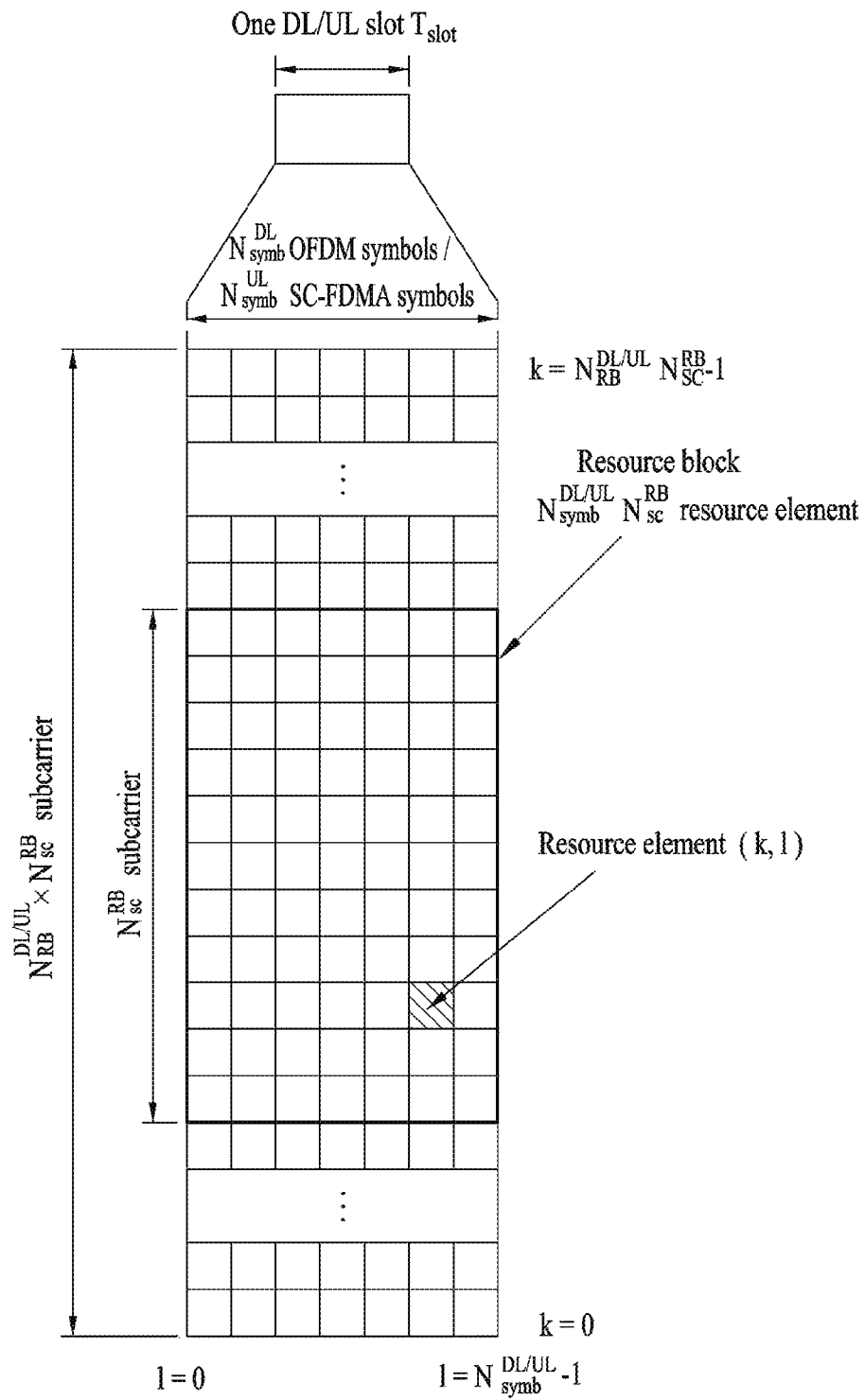
FIG. 2 illustrates an example of a downlink/uplink (DL/UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constituting one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, 1) in a slot. Here, k is an index in the range of 0 to $N_{symb}^{DL/UL} * N_{sc}^{RB} - 1$ in the frequency domain and 1 is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
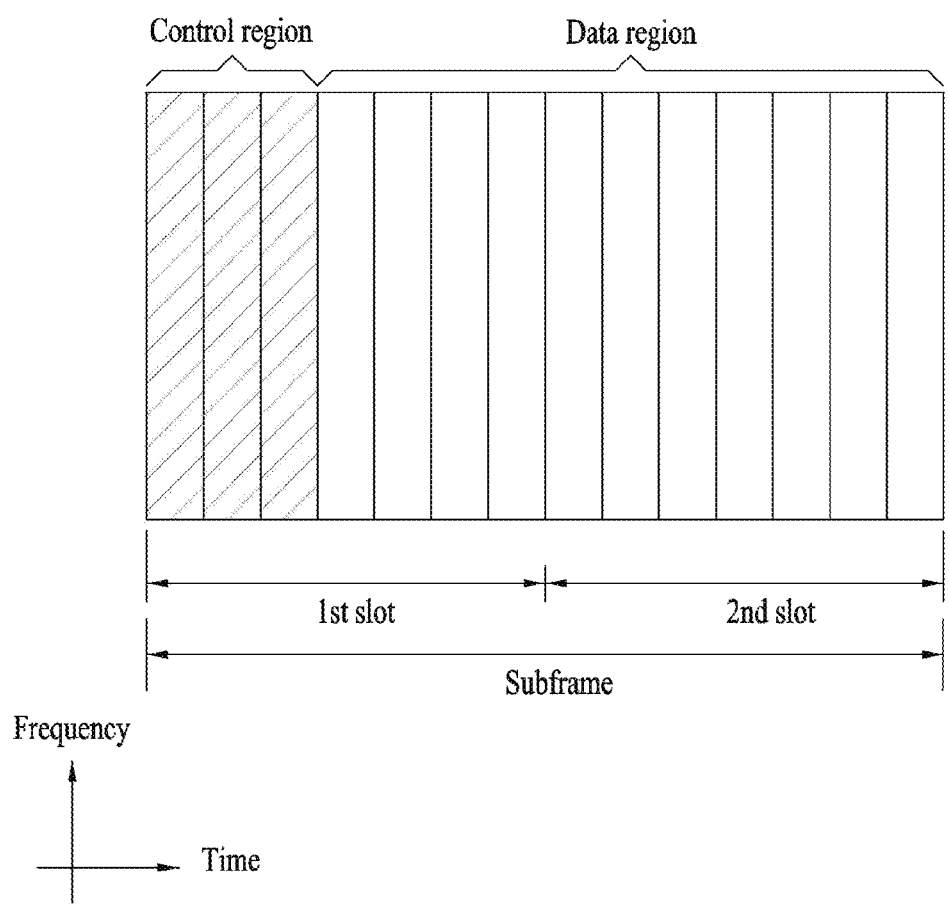
FIG. 3 illustrates a downlink (DL) subframe structure used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PC-FICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Type | Search Space | | Number of PDCCH candidates $M^{(L)}$ |
|---|---|---|---|
| | Aggregation Level | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
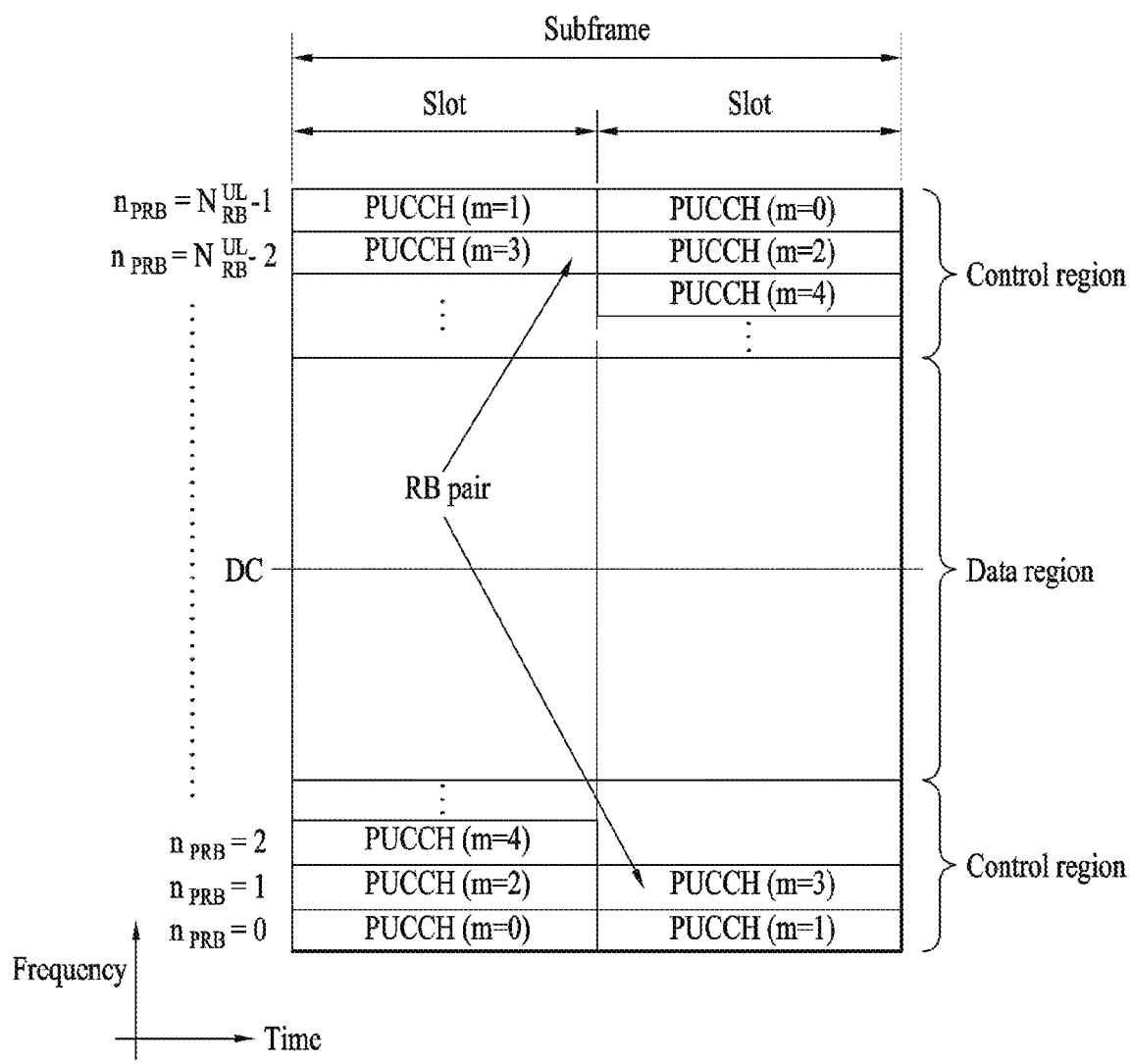
FIG. 4 illustrates an example of an uplink (UL) subframe structure used in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A (exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI +ACK/NACK | Normal CP only |
| 2b | QPSK + QPSK | 22 | CQI/PMI/RI +ACK/NACK | Normal CP only |
| 3 | QPSK | 48 | ACK/NACK or SR + ACK/NACK or CQI/PMI/RI +ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

CSI Reporting

In the 3GPP LTE(-A) system, a user equipment (UE) is defined to report CSI to a BS. Herein, the CSI collectively refers to information indicating the quality of a radio channel (also called a link) created between a UE and an antenna port. The CSI includes, for example, a rank indicator (RI), a precoding matrix indicator (PMI), and a channel quality indicator (CQI). Herein, the RI, which indicates rank information about a channel, refers to the number of streams that a UE receives through the same time-frequency resource. The RI value is determined depending on long-term fading of the channel, and is thus usually fed back to the BS by the UE with a longer period than for the PMI and CQI. The PMI, which has a value reflecting the channel space property, indicates a precoding index preferred by the UE based on a metric such as SINR. The CQI, which has a value indicating the intensity of a channel, typically refers to a reception SINR which may be obtained by the BS when the PMI is used.

The UE calculates, based on measurement of the radio channel, a preferred PMI and RI from which an optimum or highest transmission rate may be derived when used by the BS in the current channel state, and feeds back the calculated PMI and RI to the BS. Herein, the CQI refers to a modulation and coding scheme providing an acceptable packet error probability for the PMI/RI that is fed back.

On the other hand, in LTE-A systems, which are expected to include more precise MU-MIMO and explicit CoMP operations, current CSI feedback is defined in LTE and therefore does not adequately support such newly introduced operations. As the requirements for CSI feedback accuracy become increasingly difficult to achieve sufficient MU-MIMO or CoMP throughput gains, the PMI is able to achieve long term/wideband PMI (W1) and short (short) term/subband PMI (W2). In other word, the final PMI is expressed by a function of the $W_1$ and the $W_2$. For example, the final PMI W can be defined as follows: $W=W_1*W_2$ or $W=W_2*W_1$. Hence, in LTE-A, CSI can be configured by RI, $W_1$, $W_2$, and CQI.

In the 3GPP LTE(-A) system, an uplink channel used for CSI transmission is configured as shown in Table 7.

TABLE 7

| Scheduling scheme | Periodic CSI transmission | Aperiodic CSI transmission |
|---|---|---|
| Frequency non-selective | PUCCH | — |
| Frequency selective | PUCCH | PUSCH |

Referring to Table 7, CSI may be transmitted with a periodicity defined in a higher layer, using a physical uplink control channel (PUCCH). When needed by the scheduler, a physical uplink shared channel (PUSCH) may be aperiodically used to transmit the CSI. Transmission of the CSI over the PUSCH is possible only in the case of frequency selective scheduling and aperiodic CSI transmission. Hereinafter, CSI transmission schemes according to scheduling schemes and periodicity will be described.

1) Transmitting the CQI/PMI/RI over the PUSCH after receiving a CSI transmission request control signal (a CSI request)

A PUSCH scheduling control signal (UL grant) transmitted over a PDCCH may include a control signal for requesting transmission of CSI. The table below shows modes of the UE in which the CQI, PMI and RI are transmitted over the PUSCH.

TABLE 8

| | PMI Feedback Type | | |
|---|---|---|---|
| | No PMI | Single PMI | Multiple PMIs |
| PUSCH CQI Feedback Type | Wideband (Wideband CQI) | | Mode 1-2 RI 1st wideband CQI (4 bit) 2nd wideband |

TABLE 8-continued

| | PMI Feedback Type | | |
|---|---|---|---|
| | No PMI | Single PMI | Multiple PMIs |
| UE selected (Subband CQI) | Mode 2-0<br>RI (only for Open-loop SM)<br>1st wideband CQI (4 bit) + Best-M CQI (2 bit)<br>(Best-M CQI: An average CQI for M SBs selected from among N SBs)<br>Best-M index (L bit) | | CQI (4 bit)<br>if RI > 1<br>N * Subband PMI (4 bit)<br>(N is the total # of subbands)<br>(if 8Tx Ant,<br>N * subband W2 + wideband W1)<br>Mode 2-2<br>RI<br>1st wideband CQI (4 bit) + Best-M CQI (2 bit)<br>2nd wideband CQI (4 bit) + Best-M CQI (2 bit) if RI > 1<br>Best-M index (L bit)<br>Wideband PMI (4 bit) + Best-M PMI (4 bit)<br>(if 8Tx Ant,<br>wideband W2 + Best-M W2 + wideband W1) |
| Higher Layer-configured (Subband CQI) | Mode 3-0<br>RI (only for Open-loop SM)<br>1st wideband CQI (4 bit) + N * subbandCQI (2 bit) | Mode 3-1<br>RI<br>1st wideband CQI (4 bit) + N * subbandCQI (2 bit)<br>2nd wideband CQI (4 bit) + N * subbandCQI (2 bit)<br>if RI > 1<br>Wideband PMI (4 bit)<br>(if 8Tx Ant,<br>wideband W2 + wideband W1) | Mode 3-2<br>RI<br>1st wideband CQI (4 bit) + N * subbandCQI (2 bit)<br>2nd wideband CQI (4 bit) + N * subbandCQI (2 bit)<br>if RI > 1<br>N * Subband PMI (4 bit)<br>(N is the total # of subbands)<br>(if 8Tx Ant,<br>N * subband W2 + wideband W1) |

The transmission modes in Table 8 are selected in a higher layer, and the CQI/PMI/RI are all transmitted in a PUSCH subframe. Hereinafter, uplink transmission methods for the UE according to the respective modes will be described.

Mode 1-2 represents a case where precoding matrices are selected on the assumption that data is transmitted only in subbands. The UE generates a CQI on the assumption of a precoding matrix selected for a system band or a whole band (set S) designated in a higher layer. In Mode 1-2, the UE may transmit a CQI and a PMI value for each subband. Herein, the size of each subband may depend on the size of the system band.

A UE in Mode 2-0 may select M preferred subbands for a system band or a band (set S) designated in a higher layer. The UE may generate one CQI value on the assumption that data is transmitted for the M selected subbands. Preferably, the UE additionally reports one CQI (wideband CQI) value for the system band or set S. If there are multiple codewords for the M selected subbands, the UE defines a CQI value for each codeword in a differential form.

In this case, the differential CQI value is determined as a difference between an index corresponding to the CQI value for the M selected subbands and a wideband (WB) CQI index.

The UE in Mode 2-0 may transmit, to a BS, information about the positions of the M selected subbands, one CQI value for the M selected subbands and a CQI value generated for the whole band or designated band (set S). Herein, the size of a subband and the value of M may depend on the size of the system band.

A UE in Mode 2-2 may select positions of M preferred subbands and a single precoding matrix for the M preferred subbands simultaneously on the assumption that data is transmitted through the M preferred subbands. Herein, a CQI value for the M preferred subbands is defined for each codeword. In addition, the UE additionally generates a wideband CQI value for the system band or a designated band (set S).

The UE in Mode 2-2 may transmit, to the BS, information about the positions of the M preferred subbands, one CQI value for the M selected subbands and a single PMI for the M preferred subbands, a wideband PMI, and a wideband CQI value. Herein, the size of a subband and the value of M may depend on the size of the system band.

A UE in Mode 3-0 generates a wideband CQI value. The UE generates a CQI value for each subband on the assumption that data is transmitted through each subband. In this case, even if RI>1, the CQI value represents only the CQI value for the first codeword.

A UE in Mode 3-1 generates a single precoding matrix for the system band or a designated band (set S). The UE generates a CQI subband for each codeword on the assumption of the single precoding matrix generated for each subband. In addition, the UE may generate a wideband CQI on the assumption of the single precoding matrix. The CQI value for each subband may be expressed in a differential form. The subband CQI value is calculated as a difference between the subband CQI index and the wideband CQI index. Herein, the size of each subband may depend on the size of the system band.

A UE in Mode 3-2 generates a precoding matrix for each subband in place of a single precoding matrix for the whole band, in contrast with the UE in Mode 3-1.

2) Periodic CQI/PMI/RI transmission over PUCCH

The UE may periodically transmit CSI (e.g., CQI/PMI/PTI (precoding type indicator) and/or RI information) to the BS over a PUCCH. If the UE receives a control signal instructing transmission of user data, the UE may transmit a CQI over the PUCCH. Even if the control signal is transmitted over a PUSCH, the CQI/PMI/PTI/RI may be transmitted in one of the modes defined in the following table.

TABLE 9

| | | PMI feedback type | |
| --- | --- | --- | --- |
| | | No PMI | Single PMI |
| PUCCH CQI feedback type | Wideband (wideband CQI) | Mode 1-0 | Mode 1-1 |
| | UE selective (subband CQI) | Mode 2-0 | Mode 2-1 |

Figure 9:
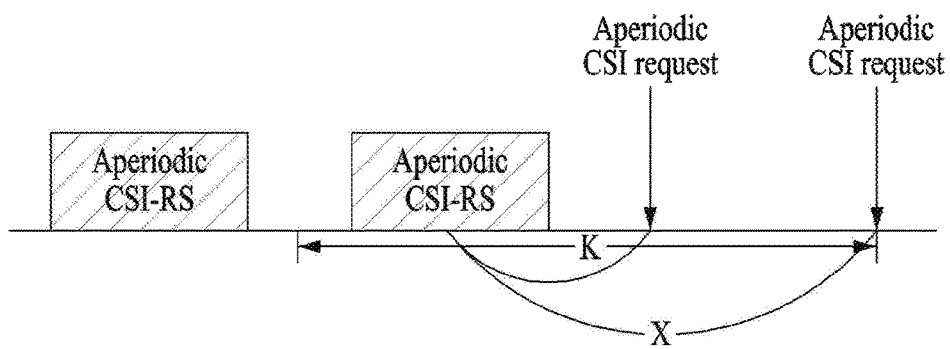
FIG. 9 illustrates an aperiodic CSI request and a target CSI-RS resource thereof according to an embodiment of the present invention.

A UE may be set in transmission modes as shown in FIG. 9. Referring to FIG. 9, in Mode 2-0 and Mode 2-1, a bandwidth part (BP) may be a set of subbands consecutively positioned in the frequency domain, and cover the system band or a designated band (set S). In Table 9, the size of each subband, the size of a BP and the number of BPs may depend on the size of the system band. In addition, the UE transmits CQIs for respective BPs in ascending order in the frequency domain so as to cover the system band or designated band (set S).

The UE may have the following PUCCH transmission types according to a transmission combination of CQI/PMI/PTI/RI.

i) Type 1: the UE transmits a subband (SB) CQI of Mode 2-0 and Mode 2-1.

ii) Type 1a: the UE transmits an SB CQI and a second PMI.

iii) Types 2, 2b and 2c: the UE transmits a WB-CQI/PMI.

iv) Type 2a: the UE transmits a WB PMI.

v) Type 3: the UE transmits an RI.

vi) Type 4: the UE transmits a WB CQI.

vii) Type 5: the UE transmits an RI and a WB PMI.

viii) Type 6: the UE transmits an RI and a PTI.

ix) Type 7: the UE transmits a CRI(CSI-RS resource indicator) and an RI.

x) Type 8: the UE transmits a CRI, an RI and a WB PMI.

xi) Type 9: the UE transmits a CRI, an RI and a PTI (precoding type indication).

xii) Type 10: the UE transmits a CRI.

When the UE transmits an RI and a WB CQI/PMI, the CQI/PMI are transmitted in subframes having different periodicities and offsets. If the RI needs to be transmitted in the same subframe as the WB CQI/PMI, the CQI/PMI are not transmitted.

The present invention proposes a method for configuring and utilizing two or more CSI-RSs in one CSI process when CSI-RSs are configured for a UE in a full dimension (FD)-MIMO environment to perform channel measurement. The present invention also proposes a resource configuration method and transmission method for configuring an aperiodic CSI-RS, signaling about an indication method for the transmission, and related operations.

CSI Process Including Multiple CSI-RS Resources

In the case of a beamformed CSI-RS, a situation wherein a CSI-RS that is beamformed in different vertical directions is allocated to a UE and used is considered. To this end, a situation wherein a plurality of CSI-RSs having different "properties" is configured for one CSI process is discussed. The "properties" may be as follows.

RE locations in RBs (mapping)
Transmission period/offset
Transmission subband
Number of antenna ports
Vertical beam
Scrambling ID
Periodic/aperiodic A plurality of CSI-RSs having at least one of the above properties differing thereamong may be configured in one CSI process such that the CSI-RSs are used for different purposes (CSI, RSRP, etc.) according to the properties of each CSI-RS. That is, CSI-RSs may be configured in one CSI process such that CSI on the different CSI-RSs is fed back while the CSI feedback chain is maintained. At this time, if an aperiodic CSI-RS request has been transmitted to the UE and there are two or more CSI-RSs that may be targets of aperiodic CSI in the CSI process, the UE performs aperiodic CSI reporting on all CSI-RSs configured to be subjected to aperiodic CSI transmission among the CSI-RSs configured in the CSI process.

Configuring a feedback method for CSI-RS

First Alternative: Channel measurement/feedback configuration for each CSI-RS

Different feedback types may be configured for the respective CSI-RSs configured in a CSI process. For example, when four CSI-RSs are designated, the feedback method therefor may be configured as shown in FIG. 5.

In this case, CSI-RS 1 is used to perform periodic and aperiodic CSI reporting, and CSI-RS 2 is used to perform aperiodic CSI reporting. RSRP for each of CSI-RSs 1-4 may be measured/transmitted. The corresponding feedback type may be configured through RRC. In this case, the CSI-IM defined in the CSI process may be paired with the CSI-RSs (CSI-RS 1, 2 in the above example) for which CSI feedback is provided and be used for interference measurement.

Figure 5:
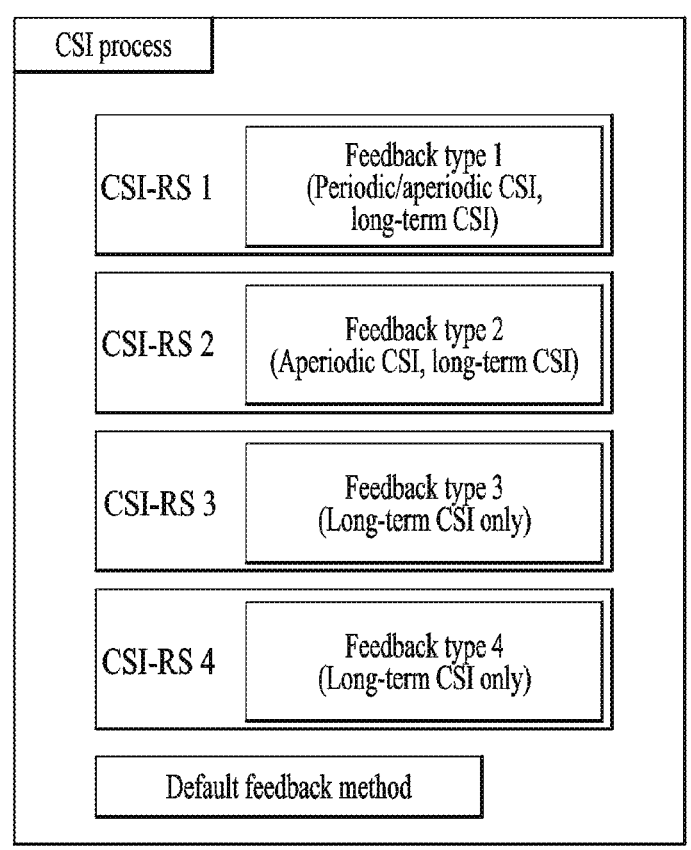
FIG. 5 illustrates a plurality of CSI-RS configurations within a single CSI process and a default feedback method.

In the case of a CSI-RS configured as a target of periodic or aperiodic feedback, parameters (e.g., feedback mode, period, offset, etc.) for the corresponding feedback method should be set, which may be implemented using the default method of the corresponding CSI process as shown in FIG. 5, or may be set independently for the CSI-RS.

Second Alternative: Defining "states" related to channel measurement/feedback and setting a "state" for each CSI-RS A feedback method may be specified for each CSI-RS by configuring the following states and designating the same for each CSI-RS.

1. Active: the active state is set for a CSI-RS subject to CSI measurement and feedback according to the method configured in the CSI process and a CSI-RS subject to long-term CSI measurement for vertical beam selection.

2. Non-active: the non-active state is set for a CSI-RS that is not involved in CSI feedback configured in the CSI process but is merely subject to long-term CSI measurement for vertical beam selection or the like.

3. Off: the Off state is set for a CSI-RS resource that is not involved in feedback or measurement/feedback of RSRP, but is pre-designated for the UE so as to be set to the active/non-active state in the future.

Figure 6:
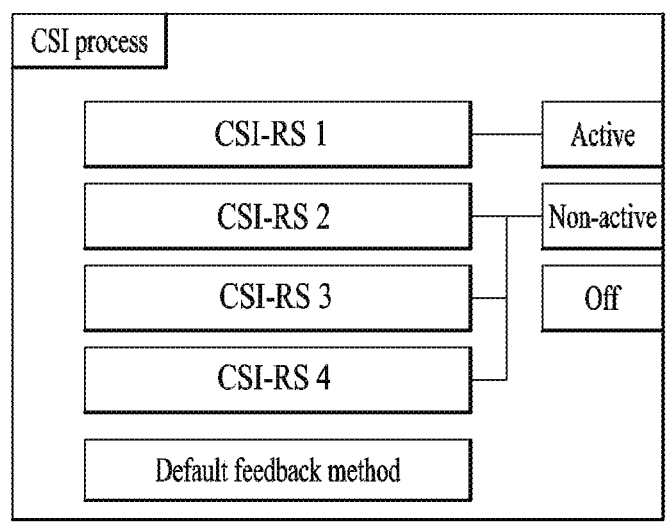
FIG. 6 illustrates a plurality of CSI-RS configurations in a single CSI process, states thereof, and a default feedback method.

FIG. 6 illustrates setting a "state" for each CSI-RS belonging to a single CSI process according to an embodiment of the present invention.

In this case, the CSI-IM defined in the CSI process may be connected with the active CSI-RS (CSI-RS 1 in this example) and used to measure interference.

In this case, the number of CSI-RSs that may be designated to each state may be limited. For example, the number of CSI-RSs set to the active state may be limited to one, and the number of CSI-RSs set to the non-active state may be limited to three. There may be no CSI-RS that is set to the off state.

The second alternative has a default feedback method. In this case, the CSI-RSs included in the corresponding CSI process should be defined within a configuration (for example, a configuration in the same codebook) to which the corresponding feedback method is applicable.

The state of the corresponding CSI-RS may be designated through RRC, MAC or DCI. In particular, in the case of the DCI, a CSI-RS that becomes active among the CSI-RSs designated to the non-active state may be designated, and the CSI-RSs which are not selected may be assumed to be in the non-active state.

Hierarchy of CSI-RSs

If a plurality of CSI processes is configured, or two or more CSI-RSs are configured in one CSI process, transmission resources for the CSI-RSs may overlap each other. In particular, in the case of periodic/aperiodic CSI, if the CSI-RS corresponding to the periodic CSI report is different from the CSI-RS corresponding to the aperiodic CSI report, it may be necessary to transmit an aperiodic CSI-RS for an aperiodic CSI request. In this case, when the aperiodic CSI-RS resource overlaps the periodic CSI-RS resource, the CSI-RS for the aperiodic CSI request may be transmitted and the CSI-RS for the periodic CSI report may be dropped.

Alternatively, some CSI-RSs may be CSI-RSs for long-term CSI for vertical CSI-RS selection and other CSI-RSs may be CSI-RSs for short-term CSI for horizontal CSI measurement/transmission for a selected vertical beam. In this case, if the transmission resources (such as, for example, time, frequency, beam, etc.) for the CSI-RS for the long-term CSI overlap the CSI-RS resources for the short-term CSI, the CSI-RS for the long-term CSI may be transmitted and the CSI-RS for the short-term CSI may be dropped. That is, the following CSI-RS hierarchy is possible.

Level 3: Aperiodic CSI-RS
Level 2: Long-term CSI-RS
Level 1: Short-term CSI-RS

When a transmission resource of a higher level CSI-RS overlaps a transmission resource of a lower level CSI-RS, the higher level CSI-RS may be transmitted and the lower level CSI-RS may be dropped.

Aperiodic CSI-RS

When a plurality of CSI-RS resources is included in one CSI process as described above, one of the resources may be for an aperiodic CSI-RS, or only a single aperiodic CSI-RS resource or configuration may be included in the CSI process. In the following description of the present invention, it is basically assumed that a plurality of CSI-RS resources is included in one CSI process as in the former case, but it is evident that the following detailed description is also applicable to the latter case. Setting of the properties (RE location (mapping) in an RB, transmission subband, scrambling ID, etc.) other than the time for the aperiodic CSI-RS may be preconfigured through higher-layer signaling or the like. The aperiodic CSI-RS may be measured/transmitted as aperiodic CSI, or be considered as an aperiodic CSI-RS for another UE and ignored, depending on whether or not an aperiodic CSI request is received.

The aperiodic CSI-RSs may be distinguished by how the resources are configured and used.

First Alternative: transmission of an aperiodic CSI-RS may be performed within a preconfigured CSI-RS resource pool. In particular, to avoid using additional CSI-RS resources, the aperiodic CSI-RS may be transmitted using resources already allocated to periodic CSI-RS transmission. In this case, if there is no transmission of the aperiodic CSI-RS, the corresponding resource is used for the existing periodic CSI-RS transmission. Hereinafter, additional techniques will be described on the basis of "a case of transmitting the aperiodic CSI-RS using resources already allocated to periodic CSI-RS transmission". However, the details given below may also be applied even when an independent aperiodic CSI-RS transmission resource separated from the periodic CSI-RS transmission resource is considered. In this case, the following specific indicators or UE operations may be applied only in relation to the corresponding aperiodic CSI-RS transmission and may be operated independently of other periodic CSI-RS configurations.

The BS may transmit an aperiodic CSI-RS indication to the UE, thereby informing the UE of transmission of the aperiodic CSI-RS. The "aperiodic CSI-RS indication" may be an explicit signaling message separate from the "aperiodic CSI request". In this case, the "aperiodic CSI-RS indication" may be interpreted as indicating an actual transmission instance of the corresponding aperiodic CSI-RS. Alternatively, the "aperiodic CSI-RS indication" may not be provided separately, but may be signaled implicitly in connection with the "aperiodic CSI request". The aperiodic CSI-RS indication indicates that an aperiodic CSI-RS having a different configuration from the existing CSI-RS has been transmitted instead of the existing CSI-RS subjected to periodic transmission. Therefore, the UE should not use the CSI-RS transmitted in the corresponding subframe for periodic CSI reporting. Instead, the aperiodic CSI-RS sent in the corresponding subframe may be used for an aperiodic CSI request according to the aperiodic CSI request. That is, a UE receiving both the aperiodic CSI-RS indication and the aperiodic CSI request may measure or transmit aperiodic CSI that uses the corresponding aperiodic CSI-RS, on the assumption that a CSI-RS is transmitted in an aperiodic CSI-RS resource. In addition, a UE receiving only the aperiodic CSI-RS indication may interpret the aperiodic CSI-RS indication as a dynamic zero power (ZP) CSI-RS indication and may thus recognize that data has not been transmitted in the corresponding subframe as in the case where the aperiodic CSI-RS resource is rate-matched, and operate according to the recognition.

The aperiodic CSI-RS indication may be transmitted using DCI. When the UE receives an aperiodic CSI-RS indication signal in subframe n, the transmission time of the aperiodic CSI-RS may be given as follows.

1. The transmission time of the aperiodic CSI-RS may be interpreted as subframe n+p. Here, p is an aperiodic CSI-RS transmission delay, and the UE may be informed thereof by explicitly transmitting p in the aperiodic CSI-RS indication field of the DCI.

2. Without separate signaling, it may be interpreted based on a predefined constant p that an aperiodic CSI-RS is transmitted in subframe n+p.

A. In particular, when p=0, an aperiodic CSI-RS may be transmitted in the same subframe as the transmission timing of the aperiodic CSI-RS indication.

In accordance with the method of indicating each aperiodic CSI-RS transmission time, the corresponding signal may be structured as follows.

1. An integer between [0, P] or an integer representing "no aperiodic CSI-RS state" is transmitted as p. P is the maximum aperiodic CSI-RS transmission delay and requires P+2 states including "no aperiodic CSI-RS state", i.e., $\log_2 (P+2)$ bits in total. The following table summarizes an example for P=6.

TABLE 8

| Index | Description |
| --- | --- |
| 0 | No aperiodic CSI-RS transmission |
| 1 | p = 0 |
| 2 | Delay 1, Subframe p = 1 |
| 3 | Delay 2, Subframe p = 2 |
| 4 | Delay 3, Subframe p = 3 |
| 5 | Delay 4, Subframe p = 4 |
| 6 | Delay 5, Subframe p = 5 |
| 7 | Delay 6, Subframe p = 6 |

Alternatively, the signal may indicate a previous aperiodic CSI-RS transmitted before the reception time of the aperiodic CSI-RS indication, in place of the delay. In this case, the transmission time of the aperiodic CSI-RS may be interpreted as the time of subframe n−p, and a table such as Table 10 above may be used without modification. However, the table above may refer to an aperiodic CSI-RS instance indication in place of the aperiodic CSI-RS transmission delay.

The aperiodic CSI-RS instance indicator may be signaled on the aperiodic CSI-RS resource basis as shown in Table 11. That is, the UE may report aperiodic CSI using the first aperiodic CSI-RS or the second aperiodic CSI-RS with respect to the reception time of the aperiodic CSI-RS indication according to the corresponding field value.

TABLE 9

| Index | Description |
| --- | --- |
| 0 | The latest instance of CSI-RS resource X |
| 1 | The second latest instance of CSI-RS resource X |

2. Alternatively, the BS may transmit only an on/off indication of the aperiodic CSI-RS in the form of {0, 1} as an aperiodic CSI-RS indication. Here is an example:

TABLE 10

| Index | Description |
| --- | --- |
| 0 | No aperiodic CSI-RS |
| 1 | Aperiodic CSI-RS transmission |

The DCI may be transmitted as cell-common DCI using an SI-RNTI. In this case, a UE using the cell ID of the corresponding cell may receive the DCI such as DCI 1A or 1C and use the aperiodic CSI-RS indication. In this case, the BS may transmit the aperiodic CSI-RS indication to the UE using the space added to the existing DCI. The size of the space is determined according to the method of indicating the aperiodic CSI-RS transmission time described above.

Figure 8:
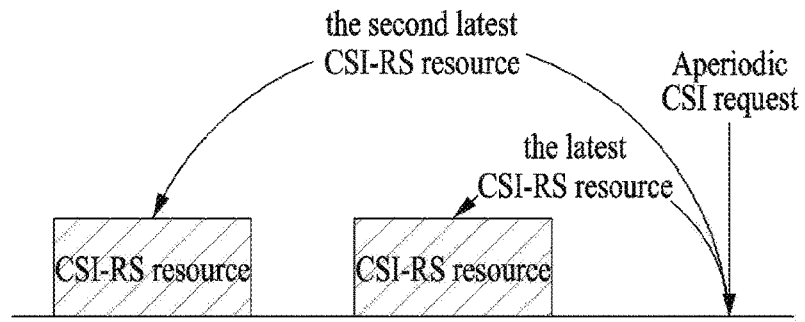
FIG. 8 illustrates an aperiodic CSI request and a target CSI-RS resource thereof according to an embodiment of the present invention.

Alternatively, when the SI-RNTI is used in DCI 1A, the aperiodic CSI-RS indication may be transmitted using a part of the reserved space. For example, when the SI-RNTI is used as shown in FIG. 8, a space corresponding to a HARQ process number (which is defined using 3 bits for FDD and 4 bits for TDD) and a downlink assignment index (which is defined using 2 bits for TDD only) is reserved. If K aperiodic CSI-RSs (CSI-RS resources) are defined, K bits in the reserved space may be used to notify the UE in the cell of on/off of each aperiodic CSI-RS in a bitmap format. Here, K should be less than or equal to the size of the available space. If FDD is used and a space corresponding to the HARQ process number is used, K may be less than or equal to 3.

Alternatively, the aperiodic CSI-RS indication may be broadcast using a DCI such as DCI format 3/3A.

In this case, the DCI may be transmitted using an RNTI for use in broadcast such as the SI-RNTI or a separate RNTI such as an aperiodic-CSI-RS-RNTI, which is used only for the corresponding information.

New DCI Format X

As described above, DCI format X as shown in FIG. 7 masked with a separate RNTI such as aperiodic-CSI-RS-RNTI may be cell-specifically transmitted. The DCI format X may be transmitted through a common search space (CSS). In this case, the BS may pre-inform each UE of bit-to-UE assignment information indicating which bit(s) of the bitmap in DCI format X are the aperiodic CSI-RS indication corresponding to each UE, through higher layer signaling such as RRC signaling. In this case, upon detecting DCI format X, the UE may recognize, through the information about the bit location thereof, whether or not the UE should measure the corresponding aperiodic CSI-RS, and/or may determine, based on the location of the other bits, whether the aperiodic CSI-RS is an aperiodic CSI-RS transmitted for another UE. Even if the UE fails to determine whether the aperiodic CSI-RS is an aperiodic CSI-RS transmitted for another UE, it may recognize that corresponding RE locations are not used for data transmission due to aperiodic CSI-RS transmission for another UE. Thereby, when the UE receives a DL grant in the subframe, the UE may allow the RE locations to be used for rate matching in the PDSCH RE mapping operation.

Figure 7:
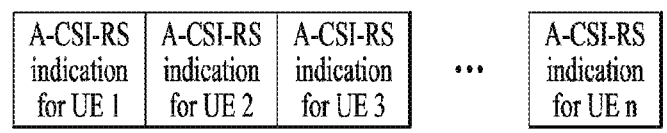
FIG. 7 illustrates a structure of a new DCI format according to an embodiment of the present invention.

As a result, as shown in FIG. 7, DCI format X may be transmitted for use in a specific (cell-specific) common zero power (ZP) CSI-RS indication. If RRC signaling for the aforementioned bit-to-UE assignment information is not configured, DCI format X may be defined or configured to be usable only for PDSCH/EPDCCH rate matching signaling. That is, in this case, an aperiodic CSI-RS indication for aperiodic CSI-RS measurement may be provided via separate DCI.

The length of DCI format X may be set to be equal to that of a specific DCI format (e.g., DCI format 3, 3A, 1A, and/or 1C) that may be transmitted in the legacy CSS in order to reduce blind decoding overhead of the UE. In this case, in order to make the total payload length of DCI format X equal to the length of the specific DCI, a restriction may be imposed such that zero padding is applied to the remaining space (corresponding to the DCI format length–the actual length of DCI format X).

When DCI format X is used for rate matching signaling as described above, the information present in the DCI is an aperiodic ZP CSI-RS used for rate matching of PDSCH or EPDCCH. Specifically, the BS may configure N aperiodic ZP CSI-RSs for the UE through RRC signaling and then inform the UE of an aperiodic ZP CSI-RS to be used for rate matching among the N aperiodic ZP CSI-RSs via DCI format X.

If the UE receives PDSCH or EPDCCH but fails to blind-decode DCI format X, it may attempt incorrect rate matching, thereby failing to decode the data/control signal. 1) Therefore, in order to address this issue, the UE and the BS may agree that the corresponding information is not for rate matching but indicates the RE puncturing pattern of the PDSCH/EPDCCH. In other words, the information indicated by DCI format X is the RE puncturing pattern of the PDSCH/EPDCCH, and the BS performs PDSCH/EPDCCH RE mapping in the manner of RE puncturing rather than rate matching.

That is, in mapping the REs of the PDSCH/EPDCCH, the BS performs RE mapping on the assumption that the RE(s) to which the aperiodic CSI-RS is mapped are also used to transmit the PDSCH/EPDCCH, and then transmits the aperiodic CSI-RS in the corresponding RE at the final transmission time without actually transmitting the PDSCH/EPDCCH mapped to the RE. Then, the UE may perform decoding on the PDSCH/EPDCCH assuming the aforementioned transmission operation. As a result, the UE assumes that there are noise and dummy signals instead of PDSCH/EPDCCH in the PDSCH/EPDCCH muting REs corresponding to the RE puncturing pattern, and accordingly does not calculate the LLR (log-likelihood ratio) in the PDSCH/EPDCCH muting REs.

For reference, when the PDSCH/EPDCCH is rate-matched in the aperiodic CSI-RS RE, the BS and the UE operate as follows. In mapping the PDSCH/EPDCCH RE, the BS performs RE mapping on the assumption that the PDSCH/EPDCCH is not transmitted in the aperiodic CSI-RS RE. Then, the UE transmits the PDSCH/EPDCCH. The BS also transmits an aperiodic CSI-RS in an aperiodic CSI-RS RE. Then, the UE performs decoding for the PDSCH/EPDCCH assuming the aforementioned transmission operation. As a result, the UE performs decoding assuming that the PDSCH/EPDCCH has not been mapped in the PDSCH/EPDCCH muting RE from the beginning.

Using the information on the agreement that the information is an RE puncturing pattern rather than the rate matching information is intended to ensure better reception performance. That is, even if a certain degree of error is present in detection of the RE puncturing pattern, a better data decoding result may be obtained than when there is an error in detection of rate matching information.

2) As another solution, the aggregation level of DCI format X may be raised to enhance reliability. For this purpose, the BS and the UE may limit the minimum aggregation level for DCI format X. For example, it may be agreed that DCI format X shall be transmitted at an aggregation level higher than or equal to 2.

The operation between the BS and the UE will depend on the search space in which DCI format X is transmitted. Since DCI format X contains information as a common DCI as described above, it may be preferable to basically transmit DCI format X in the CSS. However, if the space of the CSS is insufficient, it may be difficult to transmit DCI format X through the CSS. Therefore, a part of the UE-specific search space (USS) may be defined as a kind of "common-USS", and DCI format X may be transmitted through the common-USS. Instead, the common-USS may be configured to be available to any UE.

For this purpose, the aperiodic CSI-RS-RNTI may be configured as a kind of another C-RNTI. For example, when there are five UEs, UE 1 to UE 5, within a cell, the C-RNTI for UE 6 is defined as an aperiodic CSI-RS-RNTI, and is configured to be shared by all UEs. Therefore, the BS may transmit DCI format X through the "common USS" using the aperiodic CSI-RS-RNTI, i.e., through the USS associated with the aperiodic CSI-RS-RNTI, and the UE may perform blind decoding on all three search spaces, i.e., the CSS, a USS therefor, and the common-USS, for example. For example, UE 1 may perform blind decoding on the CSS, a USS for UE 1, and a USS for UE 6 (i.e., the common-USS) to receive the DCI transmitted from the BS.

In this case, the blind decoding overhead of the UE may increase. In particular, since the USS candidates have increased, blind decoding should be performed for many aggregation levels (i.e., 1, 2, 4, 8) in addition to all DCIs transmitted through the USS. Thus, in order to reduce the blind decoding overhead of the UE, blind decoding candidates may be limited for common-USS associated with the aperiodic CSI-RS-RNTI. In other words, blind decoding of the DCI transmitted in the common-USS associated with the aperiodic CSI-RS RNTI may be performed by limiting the DCI to DCI format X. Additionally or alternatively, for the common-USS associated with aperiodic CSI-RS-RNTI, the minimum aggregation level may be limited. For example, for the common-USS associated with aperiodic CSI-RS-RNTI, the minimum aggregation level may be limited to 4, as in the case of the CSS.

The aperiodic CSI-RS-RNTI may be transmitted to each UE by the BS using RRC signaling. If necessary, configuration of the common-USS corresponding to the aperiodic CSI-RS-RNTI, such as, for example, the minimum aggregation level and blind decoding candidate DCI format, may also be transmitted to each UE.

Alternatively, the DCI may be transmitted as a UE-specific DCI using the C-RNTI. In this case, the BS may transmit a corresponding aperiodic CSI-RS indication to the UE in the space added to the existing DCI. In particular, the indication may be transmitted together with an aperiodic CSI request, using an uplink DCI (DCI format 0, 4). The size of this space is determined according to the above-mentioned method of indicating the transmission time of the aperiodic CSI-RS.

A UE receiving both the aperiodic CSI-RS indication and the aperiodic CSI request measures/transmits aperiodic CSI that uses the corresponding aperiodic CSI-RS, on the assumption that the CSI-RS is transmitted on an aperiodic CSI-RS resource of the corresponding time. In particular, a UE that is performing CSI averaging does not use the corresponding subframe for periodic CSI averaging in this case, and a UE that performs RRM measurement using the aperiodic CSI-RS does not use the CSI-RS transmitted on the corresponding aperiodic CSI-RS resource in performing RRM measurement.

A UE that receives only an aperiodic CSI-RS indication and does not receive an aperiodic CSI request in a specific subframe may interpret the aperiodic CSI-RS indication as the dynamic ZP CSI-RS indication. That is, the UE may operate in the corresponding subframe as if the CSI-RS is not transmitted, assuming that the aperiodic CSI-RS resource is rate-matched. A UE that is performing CSI averaging as in the previous case does not use the corresponding subframe for CSI averaging in this case, and a UE performing measurement of radio resource management (RRM) using the periodic CSI-RS does not use the CSI-RS transmitted on the aperiodic CSI-RS resource in performing RRM measurement.

When there is an aperiodic CSI-RS satisfying the following conditions, the UE receiving the aperiodic CSI-RS request reports or transmits aperiodic CSI about the aperiodic CSI-RS. Here, it is assumed that the UE receives an aperiodic CSI request after transmission of the aperiodic CSI-RS. FIG. 9 illustrates the aforementioned conditions.

An aperiodic CSI-RS was transmitted within K subframes before the reception time of the aperiodic CSI request; and An aperiodic CSI-RS that has not been previously used for aperiodic CSI reporting is transmitted.

In this case, the BS may transmit an aperiodic CSI request to the UE before transmission of the next aperiodic CSI-RS indication after transmitting an aperiodic CSI-RS indication, such that the aperiodic CSI may reference the correct aperiodic CSI-RS.

Alternatively, when there is an aperiodic CSI-RS satisfying the following conditions, aperiodic CSI about the aperiodic CSI-RS may be transmitted. Here, it is assumed that the UE receives an aperiodic CSI request after transmitting an aperiodic CSI-RS. FIG. 9 illustrates the conditions.

An aperiodic CSI-RS indication was received within K subframes before the time of reception of an aperiodic CSI request; and An aperiodic CSI-RS to be transmitted within L subframes after the reception time of the aperiodic CSI request is transmitted.

K and L denote valid periods of aperiodic CSI-RS, and may be predefined or be transmitted to the UE through higher layer signaling. If there is no corresponding aperiodic CSI-RS, the UE may transmit CSI about a CSI-RS configured as a target of aperiodic CSI, for example, aperiodic CSI about the existing periodic CSI-RS among other CSI-RSs included in the CSI process specified in the aperiodic CSI request.

In particular, the aperiodic CSI request may be configured to perform the function of the aperiodic CSI-RS indication. In this case, when the reception time of the aperiodic CSI request is subframe n, subframe n−k, the time point at which the aperiodic CSI-RS is transmitted, should be defined based on subframe n. The transmission time may be specified in the aperiodic CSI request as shown in the table below, or may be predefined (e.g., the aperiodic CSI-RS is received in the subframe in which the aperiodic CSI request is transmitted/received as k=0).

TABLE 11

| Index | Aperiodic CSI request |
|---|---|
| 00 | No aperiodic CSI request |
| 01 | Aperiodic CSI request for CSI process 0 |
| 10 | Aperiodic CSI request, k = 0 |
| 11 | Aperiodic CSI request, k = 4 |

The aperiodic CSI-RS indication may be separately transmitted even when the aperiodic CSI-RS indication is included in the aperiodic CSI request. In this case, however, the aperiodic CSI-RS indication transmitted separately is used only as the dynamic ZP-CSI-RS indication.

Second Alternative: A separate resource pool for the aperiodic CSI-RS may be configured to configure separate aperiodic CSI-RS resources for the aperiodic CSI-RS. The CSI-RS resources may be configured in the UE through higher layer signaling such as RRC. The configurations may be divided as follows according to the operation performed when the aperiodic CSI-RS is not transmitted on the corresponding aperiodic CSI-RS resource.

2-1. When the aperiodic CSI-RS is not transmitted, the corresponding resource may be used for other purposes such as data transmission.

On the other hand, when the aperiodic CSI-RS is transmitted on a corresponding resource, the aperiodic CSI-RS indication on the resource may be interpreted as a ZP-CSI-RS. That is, when the aperiodic CSI-RS is transmitted, the corresponding resource may be considered to be rate-matched if a UE that does not use the aperiodic CSI-RS receives the aperiodic CSI-RS indication.

2-2. When the aperiodic CSI-RS is not transmitted, the corresponding resource is reserved. That is, the resource is not used for purposes other than transmission of the aperiodic CSI-RS.

In operation using the aperiodic CSI-RS of the second alternative, the method of the first alternative may be used. That is, as in operation of the first alternative, a UE receiving both the aperiodic CSI-RS indication and the aperiodic CSI request measures/reports aperiodic CSI that uses the corresponding aperiodic CSI-RS, on the assumption that the aperiodic CSI-RS is transmitted on an aperiodic CSI-RS resource. In addition, a UE receiving only the aperiodic CSI-RS indication may interpret the aperiodic CSI-RS indication as a dynamic ZP CSI-RS indication and may thus operate as if data has not been transmitted in the corresponding subframe as in the case where the aperiodic CSI-RS resource is rate-matched.

The following method may be used to configure the aperiodic CSI-RS resource.

Configuring periodic resources for transmission of the aperiodic CSI-RS

In this case, the transmission location of the aperiodic CSI-RS may be indicated on the basis of a preconfigured aperiodic CSI-RS resource unit.

Configuring aperiodic resources for aperiodic CSI-RS transmission

Aperiodic CSI-RS transmission subframes may be directly configured as a bitmap (e.g., subframe by subframe).

Periodic CSI-RS transmission locations may be configured, and subframes which are not used for transmission may be predefined or be configured as a bitmap.

Directly indicating aperiodic CSI-RS transmission timing

Aperiodic CSI-RS transmission timing may not be predefined, and instances of actual transmission of the aperiodic CSI-RS on the preconfigured aperiodic CSI-RS resources may be directly signaled through, for example, an aperiodic CSI-RS indication. This indication is implemented with an aperiodic CSI-RS indication, which is described below.

The aperiodic CSI-RS configuration as described above may be predefined or be configured for the UE through higher layer signaling such as RRC.

The aperiodic CSI-RS indication may be transmitted using DCI as in the first alternative described above. When the UE receives an aperiodic CSI-RS indication signal in subframe n, the transmission time of the aperiodic CSI-RS may be given as follows.

1. The transmission time of the aperiodic CSI-RS may be interpreted as subframe n+p. Here, p is an aperiodic CSI-RS transmission delay, and the UE may be informed thereof by explicitly transmitting p in the aperiodic CSI-RS indication field of the DCI.

2. Without separate signaling, it may be interpreted based on a predefined constant p that an aperiodic CSI-RS is transmitted in subframe n+p.

A. In particular, when p=0, an aperiodic CSI-RS may be transmitted in the same subframe as the transmission timing of the aperiodic CSI-RS indication.

In accordance with the method of indicating each aperiodic CSI-RS transmission time, the corresponding signal may be structured as follows.

1. An integer between [0, P] or an integer representing "no aperiodic CSI-RS state" is transmitted as p. P is the maximum aperiodic CSI-RS transmission delay and requires P+2 states including "no aperiodic CSI-RS state", i.e., $\log_2$ (P+2) bits in total. See Table 10.

Alternatively, the signal may indicate a previous aperiodic CSI-RS transmitted before the reception time of the aperiodic CSI-RS indication, in place of the delay. In this case, the transmission time of the aperiodic CSI-RS may be interpreted as the time of subframe n−p, and a table such as Table 10 above may be used without modification. However, the table above may refer to an aperiodic CSI-RS instance indication in place of the aperiodic CSI-RS transmission delay.

The aperiodic CSI-RS instance indicator may be signaled on the aperiodic CSI-RS resource basis as shown in Table 11. That is, the UE may report aperiodic CSI using the first aperiodic CSI-RS or the second aperiodic CSI-RS with respect to the reception time of the aperiodic CSI-RS indication according to the corresponding field value.

2. Alternatively, the BS may transmit only an on/off indication of the aperiodic CSI-RS in the form of {0, 1} as an aperiodic CSI-RS indication. Here is an example:

The DCI may be transmitted as cell-common DCI using an SI-RNTI. In this case, a UE using the cell ID of the corresponding cell may receive the DCI such as DCI 1A or 1C and use the aperiodic CSI-RS indication. In this case, the BS may transmit the aperiodic CSI-RS indication to the UE using the space added to the existing DCI. The size of the space is determined according to the method of indicating the aperiodic CSI-RS transmission time described above.

Alternatively, when the SI-RNTI is used in DCI 1A, the aperiodic CSI-RS indication may be transmitted using a part of the reserved space. For example, when the SI-RNTI is used, a space corresponding to a HARQ process number (which is defined using 3 bits for FDD and 4 bits for TDD) and a downlink assignment index (which is defined using 2 bits for TDD only) is reserved. If K aperiodic CSI-RSs (CSI-RS resources) are defined, K bits in the reserved space may be used to notify the UE in the cell of on/off of each aperiodic CSI-RS in a bitmap format. Here, K should be less than or equal to the size of the available space. If FDD is used and a space corresponding to the HARQ process number is used, K may be less than or equal to 3.

Alternatively, the aperiodic CSI-RS indication may be broadcast using a DCI such as DCI format 3/3A.

In this case, the DCI may be transmitted using an RNTI for use in broadcast such as the SI-RNTI or a separate RNTI such as an aperiodic-CSI-RS-RNTI, which is used only for the corresponding information.

Alternatively, the DCI may be transmitted as a UE-specific DCI using the C-RNTI. In this case, the BS may transmit a corresponding aperiodic CSI-RS indication to the UE in the space added to the existing DCI. In particular, the indication may be transmitted together with an aperiodic CSI request, using an uplink DCI (DCI format 0, 4). The size of this space is determined according to the above-mentioned method of indicating the transmission time of the aperiodic CSI-RS.

A UE receiving both the aperiodic CSI-RS indication and the aperiodic CSI request measures/transmits aperiodic CSI that uses the corresponding aperiodic CSI-RS, on the assumption that the CSI-RS is transmitted on an aperiodic CSI-RS resource of the corresponding time. In particular, a UE that is performing CSI averaging does not use the corresponding subframe for periodic CSI averaging in this case, and a UE that performs RRM measurement using the aperiodic CSI-RS does not use the CSI-RS transmitted on the corresponding aperiodic CSI-RS resource in performing RRM measurement.

A UE that receives only an aperiodic CSI-RS indication and does not receive an aperiodic CSI request in a specific subframe may interpret the aperiodic CSI-RS indication as the dynamic ZP CSI-RS indication. That is, the UE may operate in the corresponding subframe as if the CSI-RS is not transmitted, assuming that the aperiodic CSI-RS resource is rate-matched. A UE that is performing CSI averaging as in the previous case does not use the corresponding subframe for CSI averaging in this case, and a UE performing measurement of radio resource management (RRM) using the periodic CSI-RS does not use the CSI-RS transmitted on the aperiodic CSI-RS resource in performing RRM measurement.

The aperiodic CSI request may also be handled using the same method as the first alternative described above. That is, when there is an aperiodic CSI-RS satisfying the following conditions, the UE reports or transmits aperiodic CSI about the aperiodic CSI-RS. Here, it is assumed that the UE receives an aperiodic CSI request after transmission of the aperiodic CSI-RS of the BS.

An aperiodic CSI-RS was transmitted within K subframes before the reception time of the aperiodic CSI request; and An aperiodic CSI-RS that has not been previously used for aperiodic CSI reporting is transmitted.

FIG. 9 shows the example above. In this case, the BS may transmit an aperiodic CSI request to the UE before transmission of the next aperiodic CSI-RS indication after transmitting an aperiodic CSI-RS indication, such that the aperiodic CSI may reference the correct aperiodic CSI-RS.

Alternatively, when there is an aperiodic CSI-RS satisfying the following conditions, aperiodic CSI about the aperiodic CSI-RS may be transmitted. Here, it is assumed that the UE receives an aperiodic CSI request after transmitting an aperiodic CSI-RS. FIG. 9 illustrates the conditions.

An aperiodic CSI-RS indication was received within K subframes before the time of reception of an aperiodic CSI request; and An aperiodic CSI-RS to be transmitted within L subframes after the reception time of the aperiodic CSI request is transmitted.

Figure 10:
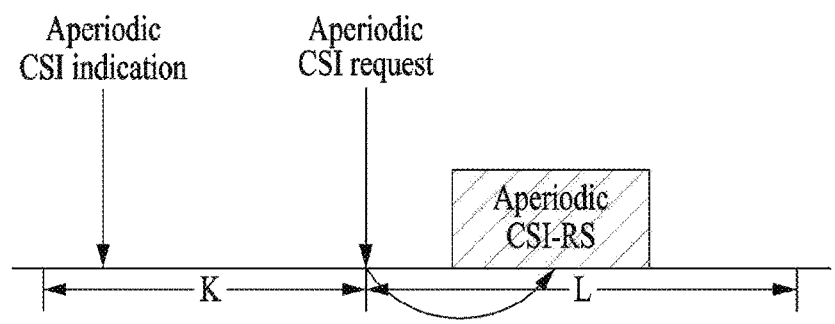
FIG. 10 illustrates an aperiodic CSI request and a target CSI-RS resource according to an embodiment of the present invention.

FIG. 10 shows the example above. K and L denote valid periods of aperiodic CSI-RS, and may be predefined or be transmitted to the UE through higher layer signaling. If there is no corresponding aperiodic CSI-RS, the UE may transmit CSI about a CSI-RS configured as a target of aperiodic CSI, for example, aperiodic CSI about the existing periodic CSI-RS among other CSI-RSs included in the CSI process specified in the aperiodic CSI request.

In particular, the aperiodic CSI request may be configured to perform the function of the aperiodic CSI-RS indication. In this case, when the reception time of the aperiodic CSI request is subframe n, subframe n−k, the time point at which the aperiodic CSI-RS is transmitted, should be defined based on subframe n. The transmission time may be specified in the aperiodic CSI request as shown in Table 13, or may be predefined (e.g., the aperiodic CSI-RS is received in the subframe in which the aperiodic CSI request is transmitted/received as k=0).

The aperiodic CSI-RS indication may be separately transmitted even when the aperiodic CSI-RS indication is included in the aperiodic CSI request. In this case, however, the aperiodic CSI-RS indication is used only as the dynamic ZP-CSI-RS indication.

Transmission Medium for Aperiodic CSI-RS Indication and Additional Considerations When the aperiodic CSI-RS indication is transmitted in the same subframe as the aperiodic CSI request (e.g., an aperiodic CSI-RS indication is jointly encoded with an aperiodic CSI request, is included in a separate field in the same DCI, or is transmitted through the DL DCI in the same subframe), and the aperiodic CSI-RS is transmitted in the subframe, the CSI-RS indication and/or the aperiodic CSI request may be defined so as not to be transmitted on the enhanced PDCCH (EPDCCH). Here, the EPDCCH refers to a control channel allocated to a data region (hereinafter, a PDSCH region) rather than the legacy control region (hereinafter, PDCCH region). As it is enabled to transmit control information about a node for each UE through the EPDCCH, an issue of possible insufficiency of the legacy PDCCH region may be addressed.

In other words, the aperiodic CSI-RS indication may be restricted so as to be included in the DCI transmitted on the PDCCH. This is because, when an aperiodic CSI-RS indication is transmitted on the EPDCCH, the entirety of one subframe may be required for the UE to decode the EPDCCH and thus the time budget for CSI processing may be insufficient. If the aperiodic CSI-RS indication is restricted to (UL) DCI that is transmitted on the PDCCH, the UE will require less time (e.g., 2 to 4 symbols) to decode the PDCCH, and thus the time budget for CSI processing may be further secured. Of course, the same method may be used even when the aperiodic CSI-RS indication is transmitted at a timing different from that of the aperiodic CSI request.

In contrast, timing for CSI processing may be relaxed. In this method, transmission of the aperiodic CSI-RS indication is not confined to the PDCCH, but the UE relaxes the time for CSI processing. To this end, the BS may inform the UE of the timing for transmitting the aperiodic CSI using the aperiodic CSI-RS, and the timing may be transmitted similarly to the indication of the aperiodic CSI-RS transmission timing described above. For example, when a subframe in which the aperiodic CSI-RS indication and the aperiodic CSI request are transmitted is subframe #n, an instruction that the UE should transmit aperiodic CSI in subframe #n+p using an aperiodic CSI-RS may be provided. Here, p (p>=4) may be signaled to the UE together with the aperiodic CSI-RS indication.

The UL data allocation at this time may be performed with the previous timing maintained. That is, when UL data allocation is transmitted together with an aperiodic CSI request through the UL DCI, resource allocation for the UL data may be applied to previous subframe #n+4 (and data is scheduled), and the aperiodic CSI using the aperiodic CSI-RS may be transmitted in subframe #n+p. In this case, the resource allocation information for the aperiodic CSI may be predefined. The UL data is configured to be transmitted through a resource region indicated in the resource allocation field of the indicated DCI.

Even when the aperiodic CSI-RS indication is transmitted at a timing different from that of the aperiodic CSI request, separate aperiodic CSI reporting timing may be indicated as above. In this case, when the aperiodic CSI reporting time is subframe #n, and the actual transmission time of the aperiodic CSI-RS is subframe #n−j, the condition $j>=j_{process}$ (e.g., $j_{process}=4$) should be satisfied. If the aperiodic CSI-RS indication can be transmitted on the EPDCCH, $j_{process}$ may be defined as $j_{process}=5$. Alternatively, $j_{process}$ may be separately applied only when the aperiodic CSI-RS indication is transmitted on the EPDCCH.

Alternatively, when the UE receives an aperiodic CSI request (and/or an aperiodic CSI-RS indication) on the EPDCCH, it may inform the BS of whether or not the existing feedback timing can be maintained, through higher layer signaling, such as RRC signaling. If the UE can maintain the existing feedback timing according to the received signaling even when the EPDCCH is used, the BS may transmit an aperiodic CSI request (and/or an aperiodic CSI-RS indication) to the UE on the EPDCCH transmitted to the UE, and may allocate a resource for CSI feedback in expectation of the same feedback timing as when an aperiodic CSI request is transmitted through the existing PDCCH. The UE may transmit or report the aperiodic CSI on the resource allocated by the BS. On the other hand, if the BS receives signaling indicating that the UE cannot maintain the existing feedback timing even when the EPDCCH is used, the BS transmits only the DCI that does not include the aperiodic CSI request to the UE on the EPDCCH. The UE also expects that the aperiodic CSI request will not be transmitted on the EPDCCH, and does not consider DCI containing the aperiodic CSI request on the EPDCCH as a blind decoding target.

Alternatively, the UE may inform the BS of the timing p at which an aperiodic CSI request (and/or an aperiodic CSI-RS indication) is transmitted on the EPDCCH, by higher layer signaling. If the BS receiving the signaling signals the aperiodic CSI request (and/or the aperiodic CSI-RS indication) to the UE on the EPDCCH, it may regard the corresponding aperiodic CSI as being transmitted in subframe #n+p (the aperiodic CSI request is transmitted in subframe #n). That is, the resource allocation included in the EPDCCH is applied to subframe #n+p. The UE may also transmit the corresponding aperiodic CSI in subframe #n+p. On the other hand, if the BS transmits the aperiodic CSI request (and/or the aperiodic CSI-RS indication) to the UE on the PDCCH, the BS and the UE may perform the operation of reporting aperiodic CSI at the existing aperiodic CSI reporting timing (e.g., subframe #n+4).

Alternatively, the range of p applied when the aperiodic CSI request is transmitted on the EPDCCH may be separately specified. This may be defined as follows.

1. The UE may inform the BS of the range of p applied when the aperiodic CSI request is transmitted on the EPDCCH.

2. The UE may inform the BS of a parameter by which the range of p applied when the aperiodic CSI request is transmitted on the EPDCCH, for example, the minimum value of the range of p. In this case, the BS may inform the UE of the range of p that may actually be used.

3. The UE may inform the BS of a parameter by which the range of p applied when the aperiodic CSI request is transmitted on the EPDCCH, for example, the minimum value of the range of p. In this case, the range of p is determined by a predefined method such as a range-of-p determination parameter, the size of the DCI field (e.g., 2 bits) required to transmit the value of p, and the index-p matching method.

4. If the UE informs the BS of whether the existing feedback timing can be used in transmitting an aperiodic CSI request on the EPDCCH, the range of p is determined by a predefined method such as a predetermined range-of-p determination parameter, the size of the DCI field (e.g., 2 bits) required to transmit the value of p, and the index-p matching method.

Although the schemes above are applicable to both the periodic CSI-RS and the aperiodic CSI-RS, the time required for calculation of the aperiodic CSI is likely to be longer than the time required for calculation of the periodic CSI-RS (for example, in the case of periodic CSI-RS, measurement may have already been performed before triggering of the aperiodic CSI). Therefore, the aforementioned schemes may be applied only when the subject of the aperiodic CSI request is the aperiodic CSI-RS instead of the periodic CSI-RS.

Processing of Multiple Aperiodic CSI-RS Transmissions

When an aperiodic CSI-RS is transmitted for two or more UEs and aperiodic CSI-RS transmission timing points for the respective UEs are adjacent to each other, there may be a plurality of aperiodic CSI-RSs satisfying the above conditions in view of the UEs. In particular, when the same resource is used for the aperiodic CSI-RSs, and the aperiodic CSI is transmitted to the UEs, the UEs need to determine an aperiodic CSI-RS to be subjected to aperiodic CSI transmission among the plurality of aperiodic CSI-RSs.

To this end, the following methods may be used.

1. The BS may directly designate, in an aperiodic CSI request, an aperiodic CSI-RS for a corresponding UE to reference to perform aperiodic CSI reporting. To this end, a field such as an aperiodic CSI-RS transmission instance indication in the aperiodic CSI-RS indication may be added to the DCI including the aperiodic CSI request.

For example, the aperiodic CSI-RS transmission instance indication may be configured as follows. The aperiodic CSI-RS transmission instance indication may indicate a previous aperiodic CSI-RS transmitted before the reception time of the aperiodic CSI-RS indication. In this case, the transmission time of the aperiodic CSI-RS may be interpreted as subframe n–p, and may be defined as shown in the following table. Here, p is the maximum delay of aperiodic CSI-RS transmission and requires $\log_2$ (P+2) bits. The following table summarizes an example for p=7.

TABLE 12

| Index | Description |
|---|---|
| 0 | p = 0 (same subframe) |
| 1 | p = 1 (before one subframe) |
| 2 | p = 2 (before 2 subframes) |
| 3 | p = 3 (before 3 subframes) |
| 4 | p = 4 (before 4 subframes) |
| 5 | p = 5 (before 5 subframes) |
| 6 | p = 6 (before 6 subframes) |
| 7 | p = 7 (before 7 subframes) |

2. The aperiodic CSI-RS indication may be included in the aperiodic CSI request. For example, when the reception timing of the aperiodic CSI request is subframe n and the reception timing of the aperiodic CSI-RS is subframe n–k, the configuration for the state of the aperiodic CSI request may be set through RRC as follows.

TABLE 13

| Index | Description |
|---|---|
| 00 | No aperiodic CSI request |
| 01 | Aperiodic CSI request for CSI process 0 |
| 10 | k = 0, an aperiodic CSI request for CSI process 1 |
| 11 | k = 4, an aperiodic CSI request for CSI process 1 |

In the example above, when an aperiodic CSI-RS is included in CSI process 1, the BS may transmit the index "11" through the aperiodic CSI request and receive a report on the aperiodic CSI based on the aperiodic CSI-RS transmitted in subframe n–4.

3. The ambiguity of the aperiodic CSI-RS may be lowered by configuring a plurality of aperiodic CSI-RS resources instead of selecting a CSI-RS to be measured through the aperiodic CSI-RS indication. The plurality of aperiodic CSI-RS resources may be mapped to different RE locations or may be mapped to the same RE location and be configured to be transmitted at different timings by setting different transmission periods and offsets. For example, when two aperiodic CSI-RS resources are configured to share the same RE location, the aperiodic CSI-RS resources are alternately configured in the time domain.

In method 3, the UE basically transmits aperiodic CSI for an aperiodic CSI-RS resource configured therefor. However, if two or more aperiodic CSI-RS resources are configured for the UE (particularly, in one CSI process), an aperiodic CSI-RS to be subjected to aperiodic CSI reporting between the aperiodic CSI-RS resources may be indicated through the aperiodic CSI request. The following table shows an example of indicating a specific aperiodic CSI-RS resource in the aperiodic CSI request.

TABLE 14

| Index | Description |
|---|---|
| 00 | No aperiodic CSI request |
| 01 | Aperiodic CSI request for CSI process 0 |
| 10 | Aperiodic CSI request for aperiodic CSI-RS resource 1 |
| 11 | Aperiodic CSI request for aperiodic CSI-RS resource 2 |

Alternatively, an aperiodic CSI-RS indication independent of the aperiodic CSI request may be transmitted.

In the above example, it is apparent that the "operation related to two or more aperiodic CSI-RS resources" may also be applied as an "operation of configuring, through a higher layer signal, two or more specific configuration (e.g., RE/timing pattern, number of antenna ports, subset of antenna ports, etc.) candidate sets that one aperiodic CSI-RS resource can have and dynamically indicating the same through DCI". In particular, the timing pattern may indicate a transmission time of the aperiodic CSI-RS as described above, and may include a plurality of transmission timing points. If $n_{ap}$ transmission timing points of the aperiodic CSI-RS are indicated through the timing pattern, this may be interpreted as meaning that ($n_{ap}$+1) aperiodic CSI-RSs including the aperiodic CSI-RS for the time when the UE receives the aperiodic CSI-RS indication are transmitted.

For example, to ensure flexibility of the aperiodic CSI-RS, a plurality of configurations (e.g., RE/timing pattern, number of antenna ports, antenna port subset, etc.) may be set for one aperiodic CSI-RS (or resource), and one of the configurations may be selected through signaling such as DCI to inform the UE of the configuration that is actually used for aperiodic CSI-RS transmission. In addition, when there are two or more aperiodic CSI-RS resources in one CSI process, configurations may be independently set for each resource. In particular, each configuration may be defined in a candidate set (e.g., RE/timing pattern, number of antenna ports, antenna port subset, etc.), and the BS may designate a specific configuration actually used for aperiodic CSI-RS transmission by means of, for example, DCI. For example, when the state '10' is dynamically indicated by the DCI, the UE uses a set corresponding to the state '10' among the two or more configuration candidate sets independently configured for each aperiodic CSI-RS resource to measure the corresponding aperiodic CSI-RS.

Alternatively, when there are two or more aperiodic CSI-RS resources in a CSI process, there may be an aperiodic CSI resource configuration (e.g., RE/timing pattern, number of antenna ports, antenna port subset, etc.) common to all (or some) configured aperiodic CSI-RS resources in the CSI process, the configuration may be established in a plurality of candidate sets (e.g., RE/timing pattern, number of antenna ports, antenna port subset, etc.), and the BS may designate a specific configuration actually used for aperiodic CSI-RS transmission by means of, for example, aperiodic DCI.

Following this method, for some properties, setting of a specific parameter (e.g., the number of antenna ports) may be semi-statically defined for each aperiodic CSI-RS resource in the CSI process through RRC signaling, and a plurality of aperiodic CSI-RS resource configuration candidate sets (e.g., RE/timing patterns, number of antenna ports, antenna port subset, etc.) common to all (or some) of the aperiodic CSI-RS resources in the CSI process may be defined for the other parameters. Thereby, the BS may designate a specific configuration actually used for aperiodic CSI-RS transmission by means of, for example, aperiodic DCI. For example, when the state '10' is dynamically indicated by the DCI, the UE uses a set corresponding to the state '10' among the candidate sets configured as common sets, and uses a set corresponding to the state '10' among the two or more configuration candidate sets independently set for each aperiodic CSI-RS resource to measure the aperiodic CSI-RSs (in the CSI process).

In addition, when there are two or more aperiodic CSI-RSs which are targets of aperiodic CSI feedback, only the most recently transmitted aperiodic CSI-RS may be used for CSI measurement. For example, when an aperiodic CSI request is transmitted in subframe n, and the aperiodic CSI is transmitted in subframe n−4 and subframe n−2 (K>=4, L=0), the UE may use the aperiodic CSI-RS transmitted in subframe n−2 for the aperiodic CSI. This may be realized in a manner that the aperiodic CSI-RS transmitted in subframe n−4 is stored in the buffer provided in the UE and is then replaced with the aperiodic CSI-RS transmitted in subframe n−2.

Alternatively, to obtain better channel measurement performance, the UE may calculate the aperiodic CSI using all the aperiodic CSI-RSs present within the duration specified above. To this end, two aperiodic CSI-RSs may be defined/configured to have the same antenna port configuration (e.g., number of antenna ports, antenna port subset).

In particular, in the case of an aperiodic CSI-RS having two or more different antenna port configurations, the UE may calculate and report a channel measurement result aggregating measurement results for the respective antenna ports. For example, to measure the CSI for a total of 12 antenna ports, a 4-port-aperiodic CSI-RS and an 8-port-aperiodic CSI-RS may be transmitted and the UE may concatenate the measurement results of these two aperiodic CSI-RSs and report the CSI about the 12 antenna ports to the BS.

In addition, in the example above, the UE may calculate the CSI about the 4-port-aperiodic CSI-RS and the CSI about the 8-port-aperiodic CSI-RS independently and then report both CSIs through one aperiodic CSI, or may select the best of the two CSIs and report a corresponding configuration and the CSI (i.e., best CSI) about the configuration.

In particular, in order to reduce overhead caused by the aperiodic CSI-RSs, the aperiodic CSI-RS to be transmitted to the UE may be transmitted through only some antenna ports (of the number of antenna ports configured through RRC). To this end, the antenna port subset for transmission of the corresponding aperiodic CSI-RS may be signaled to the UE through the aperiodic CSI-RS indication of the aperiodic CSI-RS.

To this end, an antenna port subset that is predefined or defined through higher layer signaling such as RRC signaling is given to the UE. For example, when a two-bit indication is used, the antenna port subset may be configured as follows.

First Alternative. Aperiodic CSI-RS; Resource-common Configuration:

A. An antenna port common to all aperiodic CSI-RS resources may be defined. For example, the "number of antenna ports" may be semi-statically set for each aperiodic CSI-RS resource through RRC signaling. The following table illustrates a case where the "number of antenna ports" is set to 8 for the corresponding aperiodic CSI-RS resources in common.

TABLE 15

| Subset Index | Antenna Port Subset |
|---|---|
| 00 | 4-port subset 1 (e.g., antenna ports 15, 16, 17, 18) |
| 01 | 4-port subset 2 (e.g., antenna ports 15, 16, 19, 20) |
| 10 | 8-port subset (e.g., antenna ports 15, 16, 17, 18, 19, 20, 21, 22) |
| 11 | 4-port subset 3 (e.g., antenna ports 17, 18, 21, 22) |

B. Parameters (e.g., the number of antenna ports) of some of the properties of the aperiodic CSI-RS may be resource-specifically defined, and a configuration candidate set according to the parameters may be defined for aperiodic CSI-RSs (in the CSI process) in common and be indicated through the DCI.

TABLE 16

| Subset Index | Antenna Port Subset |
|---|---|
| 00 | 2-port subset 1 (e.g., antenna ports 15 and 17) for CSI-RS resources set to 4-port or 4-port subset 1 (e.g., antenna ports 15, 16, 17 and 18) for CSI-RS resources set to 8-port |
| 01 | 2-port subset 2 (e.g., antenna ports 15 and 18) for CSI-RS resources set to 4-port or 4-port subset 2 (e.g., antenna ports 15, 17, 19 and 21) for CSI-RS resources set to 8-port |
| 10 | 2-port subset 3 (e.g., antenna ports 16 and 17) for CSI-RS resources set to 4-port or 8-port subset (e.g., antenna ports 15, 16, 17, 18, 19, 20, 21 and 22) for CSI-RS resources set to 8-port |
| 11 | 4-port subset 1 (e.g., antenna ports 15, 16, 17 and 18) for CSI-RS resources set to 4-port or 4-port subset 3 (e.g., antenna ports 15, 16, 19 and 21) for CSI-RS resources set to 4-port |

Second Alternative. Aperiodic CSI-RS; Resource-Specific Configuration (According to Antenna Port Subset)

A. An independent antenna port subset may be configured for each aperiodic CSI-RS resource. This means that, when a configuration table such as Tables 16 and 17 above is dynamically indicated by specific DCI, the corresponding state can be dynamically indicated individually for each resource-specific configuration.

In the example above, the subset index may be used to indicate the corresponding antenna port subset in the DCI.

As another technical proposal, the following options are available regarding the RE pattern in which the aperiodic CSI-RS operatively connected with the antenna port subset is actually transmitted.

Option 1. The number of antenna ports set for the aperiodic CSI-RS and a partial RE pattern in the legacy RE pattern A. In Option 1, measurement shall be performed only for the (partial) RE pattern corresponding to the antenna port subset indicated to the UE without changing the number of antenna ports set for the corresponding resource. For example, if 8 ports are configured for the resource and the antenna port subset is dynamically indicated as {15, 16, 19, 20}, the UE may measure the CSI-RS using only four REs corresponding to a given antenna port subset in the (legacy) CSI-RS RE pattern. REs not used for CSI-RS transmission may be used for other purposes (for example, data transmission).

Option 2. (Legacy, or predefined/preconfigured) RE pattern according to the number of antenna ports indicated by the antenna port (subset) configuration A. In Option 2, while the number of CSI-RS REs to be transmitted is determined according to the number of antenna ports included in the antenna port subset, and the RE pattern locations at which the corresponding CSI-RS REs are to be transmitted are fixed (as legacy, or predefined/preconfigured pattern), the antenna port numbering applied to the RE pattern shall conform to the antenna port (subset) configuration. For example, even when the BS implements 8-port transmission, this fact may or may not be configured for the UE. For example, when the antenna port subset indicates antenna ports {15, 16, 19, 20}, the UE recognizes that the aperiodic CSI-RS is subject to 4-port transmission and measures the aperiodic CSI-RS for the (legacy, or predefined/preconfigured) 4-port RE pattern. If a specific "antenna port subset (hopping/cycling) pattern" is indicated as well at this time, the UE may be defined/configured to derive and report CSI aggregated by concatenating the antenna port numbering with respect to the other ports of the CSI-RS received at different timing points.

To measure the channel for all antenna ports, the BS may configure, for the UE, an aperiodic CSI-RS having different configurations (e.g., antenna port subsets) in two or more (adjacent) subframes. Here, the union of the antenna port subsets may represent all antenna ports, and the UE may calculate and report channel information about all antenna ports by aggregating the channel information measured in the respective subframes.

In particular, in order to prevent aging of the measured channel information, certain restrictions may be imposed such that aperiodic CSI-RSs can be transmitted in adjacent subframes using different antenna port subsets. For example, in the "timing pattern" information, some of { ..., Subframe n−2, Subframe n−1, Subframe n, Subframe n+1, ... } in which aperiodic CSI-RSs are transmitted with respect to subframe n may be implicitly defined/configured, for example, in the form of "multi-shot triggering". To this end, the BS may indicate a plurality of aperiodic CSI-RSs through one DCI. If a plurality of aperiodic CSI-RSs is to be indicated through one DCI, information on the location at which each aperiodic CSI-RS is transmitted should be included, and the method described above may be used for the details of the information. For example, the RE pattern may be common to the plurality of aperiodic CSI-RSs or be predefined/preconfigured (for each resource), or may be included in the dynamic indication attribute by the "multi-shot triggering" mentioned above.

In this case, a plurality of antenna port subsets may be operatively connected with the respective aperiodic CSI-RS transmission timing points within a specific duration (which may be defined with the values of K and L described above) (in the form of an "antenna port subset" hopping/cycling pattern). For example, to actually send an aperiodic CSI-RS for 4 ports (the number of antenna ports may be set to 8 (>4) in the RRC configuration as described above), an aperiodic CSI-RS for the first antenna port subset {15, 16, 19, 20} may be set to be transmitted at the first aperiodic CSI-RS transmission timing point within a specific duration and an aperiodic CSI-RS for the second antenna port subset {17, 18, 21, 22} may be set to be transmitted at the second aperiodic CSI-RS transmission timing point within the specific duration. The antenna port subsets (or hopping/cycling pattern information) with respect to time is transmitted to the UE by higher layer signaling such as RRC or MAC signaling.

The configurations for the aperiodic CSI-RSs may be predefined or set through higher signaling such as RRC, and may be indicated to the UE by means of, for example, the DCI. That is, when 4-bit DCI signaling is used, 16 configurations may be preset or predefined through RRC, and one of the configurations may be indicated through the DCI signaling. For the configuration for the aperiodic CSI-RS, the following information, for example, may be included in the aperiodic CSI-RS related information, and it is apparent that some of the operations proposed above are applicable to at least one of the following pieces of information in the same manner. In addition, the following attributes may be included in the configuration of a periodic CSI-RS, rather than the aperiodic CSI-RS, which is mainly discussed in the present invention.

Configuration ID (for the aperiodic CSI-RS) (for example, the following attributes may be separated from each other in the configuration so as to be dynamically indicated rather than being configured within the aperiodic CSI-RS resources):

Resource (RE/timing) pattern

Antenna port subset

Number of antenna ports

Subframe-configuration (for example, if a specific subframe-configuration is indicated when a plurality of subframe-configurations is set as targets of the dynamic indication, periodic transmission may be performed with a corresponding periodicity/offset until another subframe-configuration is indicated. Alternatively, the indication may be given by a separate indicator for deactivation)

Scrambling ID (e.g., virtual cell identifier)

QCL-related information (e.g., CRS information having a QCL relationship with the aperiodic CSI-RS)

That is, at least one of the attributes above may be indicated by one DCI in the form of "multi-shot triggering" while being preset/defined in the aforementioned hopping/cycling pattern.

If the aperiodic CSI-RS indication and the transmission DCI of the aperiodic CSI request are separated from each other, the aperiodic CSI request field may be utilized for aperiodic CSI-RS indication. For example, in the case where 2 additional bits are used for the aperiodic CSI-RS indication, if the bits are transmitted in a specific state (e.g., '00'), the 2 bits of the aperiodic CSI request field may be interpreted in the same way as the existing aperiodic CSI request. If the aperiodic CSI-RS indication field is set to a value other than '00', the aperiodic CSI request field may be interpreted as X (e.g., X=12) specific states (remaining states excluding four '00xx's of the 16 states) in the 4-bit payload along with the aperiodic CSI-RS indication field, and thus the corresponding aperiodic CSI-RS indication information may be transmitted to the UE.

If UL data allocation is not needed for the UE, a field for UL data (e.g., resource allocation (RA)) in the UL DCI may be used to allow aperiodic CSI-RS configuration signaling to be less constrained in transmitting the aperiodic CSI-RS indication through the UL DCI. If a specific state (e.g., '1111') of the values of the indication field is defined in the form of, for example, an "extended aperiodic CSI-RS indication" and the state is signaled to the UE, fields which are left unused, such as the UL resource allocation field, may be utilized as additional aperiodic CSI-RS indication fields to transmit more detailed configurations to the UE. In this case, some of the UL DCI fields other than the CQI request field and the SRS request field may be used.

In order to perform aperiodic CSI reporting as described above, the corresponding CSI is piggybacked on the PUSCH and transmitted. In particular, when CSI for two or more CSI-RS resources in one CSI process is measured/reported, the UE maps the CSIs for each CSI-RS resource to PUSCH resources, starting with the lowest CSI-RS resource index. Thus, the following procedure is performed.

1. The lowest CSI process index is prioritized.
2. When the same CSI process index is given, the lowest CSI-RS resource index is prioritized.

The CSI-RS resource index is an index for a CSI-RS resource configured in a CSI process, which corresponds to CSI-RS 1 and CSI-RS 2 in FIG. 5 or 6.

In order to support the above operations using CSI processes, when the two aperiodic CSI-RS resources are allocated to different CSI processes and each CSI process is allocated to a state of the aperiodic CSI request, a two-bit aperiodic CSI request may be used to signal, to the UE, information about which aperiodic CSI-RS is transmitted. This does not require additional DCI signaling, but the CSI processes may become insufficient because the maximum number of CSI processes to be configured for the UE is limited (e.g., a maximum of five CSI processes).

TABLE 17

| Index | Aperiodic CSI request |
|---|---|
| 00 | No aperiodic CSI request |
| 01 | Aperiodic CSI request for CSI process 0 |
| 10 | Aperiodic CSI request for CSI process 1 |
| 11 | Aperiodic CSI request for CSI process 2 |

The table above shows an exemplary case where aperiodic CSI-RS resources 1 are allocated to CSI process 1 and aperiodic CSI-RS resources 2 are allocated to CSI process 2. Therefore, when '10' is transmitted to the UE through the aperiodic CSI request, the UE may measure/report aperiodic CSI for the nearest resource among aperiodic CSI-RS resources 1.

ZP CSI-RS with Beam Restriction

In order to measure interference in the CoMP environment, CSI-IM has been configured to create an environment where interference measurement is easy to perform while cooperation of adjacent BSs is underway. However, if a CSI process for measuring interference or the like is configured in a situation such as CoMP when a plurality of CSI-RSs can be configured in one CSI process as described above, resources for the CSI-RSs may be insufficient. For example, when five CSI processes are configured and four CSI-RSs are configured per CSI process, 20 CSI-RS resources are used in total. In a situation like the current LTE standard, up to 10 CSI-RS resources are available when 8 ports are given. Therefore, in configuring CSI-IM sharing CSI-RS resources as in the current environment, CSI-RS resources may be insufficient.

Therefore, a part of the properties of the CSI-RS may be restricted for a signal transmitted on the corresponding resource on behalf of CSI-IM. For example, the ZP-CSI-RS may be configured only for a UE using a specific vertical beam. However, when a vertical beam is used, it is difficult to completely eliminate the influence of interference on a specific UE depending on the characteristics of the corresponding beam, and therefore it is difficult to completely eliminate the influence of interference on the UE. In addition, the current CSI-IM cannot recognize whether interference is completely avoided on the corresponding resource or whether only a part of the interference is suppressed by vertical beam avoidance or the like. That is, with the current method, the interference effect given when a specific 'property' is used for data transmission in an interference cell may not be accurately determined.

Therefore, the BS may configure CSI-part-IM (CSI-PIM) for the UE, instead of configuring the CSI-IM. The UE aims to measure the level of interference suppression on the corresponding resource when a neighboring BS restricts a certain property in data transmission. The UE measures the interference result on the corresponding CSI-PIM resource and feeds back the result to the BS. The BS is expected to share the corresponding information among the BSs and use the same for more efficient vertical beam scheduling. For example, if there are many UEs having large interference with a specific vertical beam in cell A, the BS of cell B may restrict use of the vertical beam for a specific time in consideration of cell A. The existing CSI-IM may measure the interference on the corresponding resource and use the same in CQI calculation. In this case, an operation to be performed by the neighboring BS (for example, no transmission, routine data transmission, etc.) is not explicitly specified on the corresponding resource. That is, the interference BS may or may not transmit data on the corresponding resource. In this situation, the UE may perform interference measurement to measure interference close to the interference that will actually be received when data is transmitted.

In the case of CSI-PIM, the ZP-CSI-RS may be applied to a UE to which data transmission with a specific 'property' is performed, on the corresponding resource. For example, when an interference BS performs data transmission using a total of four vertical beams, vertical beam 0 to vertical beam 3, the ZP-CSI-RS may be applied only to resources for a UE using vertical beams 0 and 1. Therefore, on the CSI-PIM resource, the interference cell may or may not transmit data, but there is no data to be transmitted using a specific 'property'. Therefore, the UE may measure only interference incurred when transmission is performed using the specific 'property'.

In this case, the UE may directly report the amount of measured interference to the BS rather than transmitting CQI including interference measured in the CSI-PIM. Alternatively, the UE may inform the BS of whether the interference measured in the CSI-PIM is bearable. For example, if there is an interference threshold that the UE can bear, and the interference measured in the CSI-PIM is greater than the interference threshold, the UE may send a feedback indicating 'unbearable interference'. If the measured interference is less than the interference threshold, the UE may send a feedback indicating 'bearable interference'. In this case, for example, 1-bit signaling may be used to feed back '0' or '1' by defining '0' as 'bearable interference' and '1' as 'unbearable interference', or vice versa. Alternatively, the UE may directly send the absolute amount of the measured interference, and the BS may determine whether the interference is "bearable interference" in consideration of a UE interference threshold transmitted from the UE to the BS in advance, and may share the determination among the BSs. The UE may keep the interference threshold as a capability of the UE, may transmit the same to the BS when necessary, or may receive an interference threshold set and transmitted by the BS through higher layer signaling or the like.

Considering the delay between BSs, fast fading characteristics of interference are meaningless in measurement. Accordingly, long-term characteristics of interference may be measured by performing CSI-PIM for a certain period. In this case, the CSI-PIM configuration may include the start subframe/end subframe (or duration) of a resource in addition to the resource characteristics of the CSI-RS. The CSI-PIM is configured from the start subframe to the end subframe (or for the duration), and the UE measures the interference amount on the configured CSI-PIM resource during the corresponding duration.

With this method, the interference applied to the UE when the interference BS uses a specific beam may be accurately measured. In addition, if the transmission delay between BSs is small, this information may be quickly used for cooperative communication between the CoMP BSs. However, if the transmission delay between the BSs is large, a large delay gain may not be obtained compared to the following RRM measurement method.

Feedback on whether or not the interference is bearable may be sent through higher layer signaling. Alternatively, it may be used together with an aperiodic CSI request. If the aperiodic CSI request requests feedback in the aperiodically configured CSI-PIM, the UE may measure/determine whether the interference intensity measured in the corresponding CSI-PIM or the interference is bearable, and feedback the corresponding result through a UL resource.

The operation may be replaced by RRM measurement. The UE may compare the value of a measurement result with an interference threshold for a measured RRM-RS. Then, the UE may feed back whether the interference is bearable for the RRM-RS. Alternatively, the UE may transmit the interference threshold of the UE to the BS and the BS may determine whether the interference is bearable for the CSI-RS based on the RRM report value received from the UE. Alternatively, the received RRM report value may be simply shared among the BSs. In this case, there is no need to allocate an additional CSI-RS, and therefore overhead of the physical layer may be reduced, compared to the overhead in the conventional method. However, the time required for RRM measurement and communication using a higher layer is long, and accordingly a longer delay may be given than when the CSI-PIM is used.

LTE Rel-13 FD-MIMO supports beamformed CSI-RS-based operations, and the beamformed CSI-RS may be divided into two major features. Regarding the number K of NZP CSI-RS resources configured in the CSI process of Class B, Class B with K>1: CRI reporting including existing RI/PMI/CQI reporting Class B with K=1: Existing RI/PMI/CQI reporting, depending on PMI-configuration indicates to use a legacy codebook or a new codebook defined in Rel-13.

Class B with K>1 is regarded, in general, to be based on cell-specific beamformed CSI-RSs transmitted in a cell with different beamforming coefficients applied per CSI-RS, and thus the UE may select and report the index of the CSI-RS among K CSI-RSs configured by CRI reporting. However, it is not necessary to always include the cell-specific beamformed CSI-RS. Depending on implementation of the BS, UE-specific (or UE group-specific) beamformed CSI-RS resources for beam selection by the UE at the CSI-RS resource level may be given.

Class B with K=1 is regarded, in general, to be based on UE-specific beamformed CSI-RS transmitted for a UE, and thus the UE may perform CSI reporting based on the configured "UE-dedicated" beamformed CSI-RS resource. Depending on implementation of the BS, this case may also be utilized based on a UE-group-specific beamformed CSI-RS to reduce CSI-RS overhead, particularly when the common beam direction is applicable on the K=1 beamformed CSI-RS resource common to multiple UEs in a cell.

Of the features supported above for class B, potential enhancement topics related to beamformed CSI-RS-based operations are described below.

CRI Subset Restriction for Inter-Cell Interference Mitigation

Figure 11:
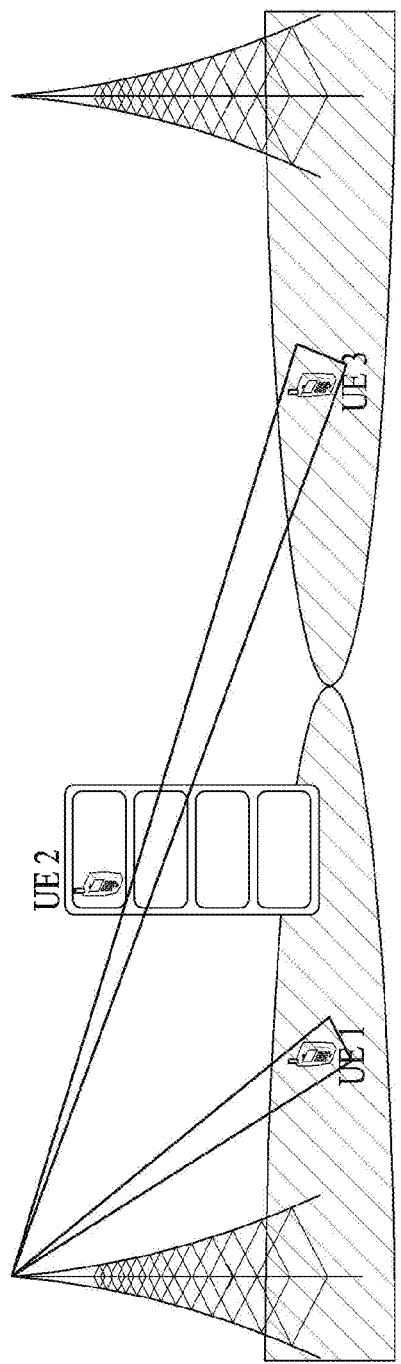
FIG. 11 illustrates transmission using a vertical beam according to an embodiment of the present invention.

For Class B with K>1, the K configured CSI-RSs are transmitted in different beam directions, which may include different vertical beam directions, as shown in FIG. 11. Certain beams, however, may cause strong interference to neighboring cells if the beam can reach UEs of the cells in the direction. For example, a beam for UE 2 may directly interfere with UE 3 of a neighboring cell, and such beam may be directed in a horizontal direction, which causes severe inter-cell interference.

To avoid this interference problem, strict beam restrictions may be considered in terms of vertical beam steering. For example, beams directed to UE 2 may be strictly forbidden. However, if there is no UE interfering with a UE in a high-rise building, or some scheduling coordination between neighboring cells is possible according to network implementation, the service can be provided through the beam for data transmission, and therefore simply restricting beams is not reasonable in any case.

Considering that current CRI reporting and related CSI feedback behaviors in Rel-13 are already supported with two subframe sets, CRI subset restrictions per subframe set may be considered to alleviate the problem and provide network flexibility to control UE's assumption to derive CRI. For example, K beamformed CSI-RSs with all beam directions may be configured for subframe set 1, whereas only a subset of K CSI-RSs may be restricted to be valid for subframe set 2. Then, the UE may measure and report CSI including CRI for each subframe set, and thus the BS may flexibly use those CSIs considering the inter-cell interference situation and possible coordination between cells.

Figure 12:
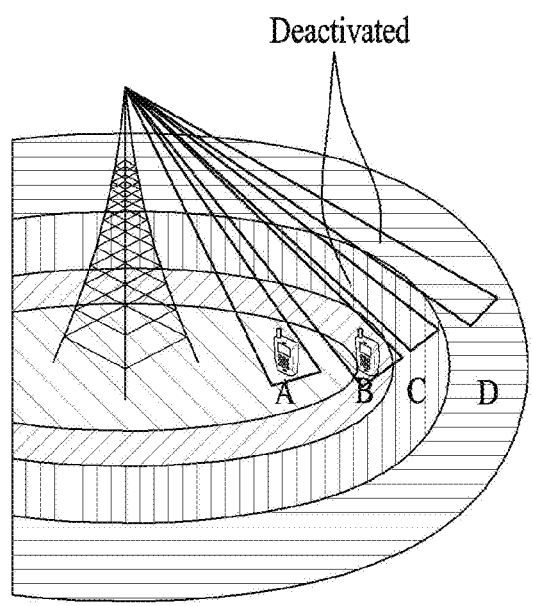
FIG. 12 illustrates transmission using a vertical beam according to an embodiment of the present invention.

CRI Subset Restriction with Subframe Sets is Considered for Inter-Cell Interference Mitigation Overhead Reduction with CSI-RS Activation/Deactivation CSI-RS overhead reduction techniques need to be investigated according to the objectives thereof. One aspect of overhead reduction should be related to handling activation/deactivation of beamformed CSI-RSs in each cell, depending on the UE distribution in the cell. More specifically, it needs to be supported that BS can turn on or off some of CSI-RSs targeting certain directions according to whether there exist UEs to be served with those beam directions. As illustrated in FIG. 12, there would be certain CSI-RSs that no UEs have chosen (or will select) for a period of time as CRI reporting, such as CSI-RSs toward zones C and D. These CSI-RSs may be deactivated by proper L2 signaling somewhat similar to Scell activation/deactivation in CA systems, which may be more appropriate than relying on RRC reconfiguration in terms of fast and effective resource utilization.

Resources for deactivated CSI-RSs may be utilized for data transmission, and thus such CSI-RS overhead reduction mechanism brings benefits to increase resource utilization efficiency. Therefore, similar L1/L2-level signaling for ZP-CSI-RS reconfiguration in consideration of updating some activated/deactivated CSI-RS REs also needs to be supported for other UEs which are not configured with Class B K>1.

Overhead Reduction Mechanism Based on CSI-RS Activation/Deactivation should be Investigated The above method is a technique for saving resources for transmission of the corresponding CSI-RS by activating/deactivating some beams of the corresponding CSI-RSs in the FD-MIMO scheme for transmitting a plurality of CSI-RSs for CRI measurement and reporting. To this end, it is necessary to deactivate the ZP CSI-RS for the non-active CSI-RS resource. In conventional cases, Class A UEs that do not report CRI or UEs that do not use FD-MIMO are supported by informing the UEs of the ZP CSI-RS configuration for the resource in order to avoid the resource through, for example, rate-matching.

If a CSI-RS for a specific resource can be activated/deactivated as described above, the resource may be configured for the UEs so as not to be rate-matched anymore by deactivating the ZP CSI-RS corresponding to the resource. To do this, signaling with a small delay, such as DCI or MAC, is used. In particular, the corresponding configuration may be cell-specifically transmitted. To this end, when DCI is used, a format such as DCI 3/3A may be used.

The ZP CSI-RS deactivation (or activation) signal may be configured as follows.

Option 1. Start time+Target ZP CSI-RS resource

For the start time, an absolute time value may be used, or an offset value with respect to the time when the signaling is received may be used.

The duration or the end time may be given through higher layer signaling, such as RRC signaling, or may be a fixed value.

Option 2. Start point+Duration+Target ZP CSI-RS resource

Option 3. Start point+End point+Target ZP CSI-RS resource

Option 4. Start point+Target ZP CSI-RS resource and Separate ZP CSI-RS activation signal Separate activation signaling is sent. Therefore, the non-active state of the ZP CSI-RS lasts until activation.

For the activation time, an absolute time value may be signaled, or an offset value with respect to the time when the corresponding signaling is received may be signaled.

Option 5. Start point+Target ZP CSI-RS resource, and separate ZP CSI-RS activation signal+Target ZP CSI-RS resource In the above scheme, the ZP CSI-RS may be selectively activated in the activation signaling.

The target resource may be transmitted in bitmap form. In this case, the resource transmitted in the bitmap may be a conventional 4-port ZP CSI-RS resource indication or a resource indicator for a separate K-port (where K may be a number other than 4) ZP CSI-RS resource configured through RRC signaling.

The ZP CSI-RS deactivation (and/or activation) signal may be interpreted as a ZP CSI-RS update signal. That is, the corresponding ZP CSI-RS may be deactivated (or activated) for the designated ZP CSI-RS resource regardless of the deactivation/activation signal. In other words, when four resources are deactivated with the ZP CSI-RS bitmap '1111', '1101' included in the next ZP CSI-RS update signal may be interpreted as activating the third ZP CSI-RS resource.

In the options above, the start time may be given through higher layer signaling such as RRC, or may be a fixed value (e.g., a subframe for receiving the indication+k subframes, k=0, 1, or 8 . . . ). In this case, the options above may not include the start time. For example, in the case of Option 1, only the target ZP CSI-RS designation signal may be included.

Without separate signaling, NZP CSI-RS deactivation signaling may be interpreted as ZP CSI-RS deactivation signaling. Alternatively, some of the fields of the NZP CSI-RS deactivation signaling (e.g., the target NZP CSI-RS resource indication field) may be interpreted as signaling (e.g., the target ZP CSI-RS resource indication field) included in the ZP CSI-RS deactivation signaling. In this case, the NZP CSI-RS should be cell-specific signaling.

The ZP CSI-RS activation/deactivation described above may be similarly applied to the NZP CSI-RS activation/deactivation signal. The NZP CSI-RS deactivation signal (and/or activation signal) may be configured as follows.

Option 1. Start point+Target NZP CSI-RS

Option 2. Start point+Duration+Target NZP CSI-RS

Option 3. Start point+End point+Target NZP CSI-RS

Option 4. Start point+Target NZP CSI-RS, and Separate NZP CSI-RS activation signal Option 5. Start point+Target NZP CSI-RS, and Separate NZP CSI-RS activation Here, the target NZP CSI-RS may be transmitted in bitmap form. In this case, the resource configured and transmitted in a bitmap may correspond to an NZP CSI-RS configured through RRC signaling or the like, and the NZP CSI-RSs corresponding to the respective bits in the bitmap may be mapped in order of resource configurations assigned thereto within the same CSI process.

Overhead Reduction with Aperiodic CSI-RS

Figure 13:
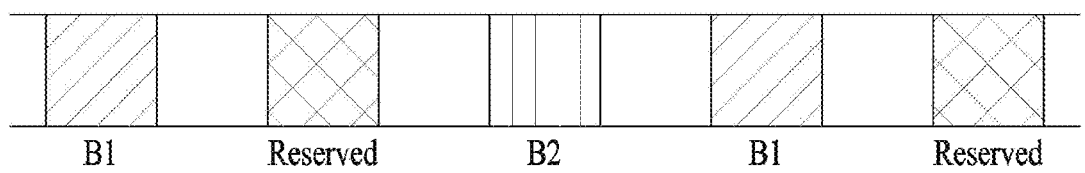
FIG. 13 illustrates CSI-RSs to which different beams are applied according to an embodiment of the present invention.

To reduce CSI-RS overhead, a measuring restriction (MR) specified in LTE Rel-13 may be utilized as aperiodic CSI-RS transmissions within preconfigured possible CSI-RS transmission instances. For a CSI-RS configured with 'MR-ON', the UE may only measure the CSI-RS when an aperiodic CSI request is received. As illustrated in FIG. 13, for example, different beams with indexes B1 and B2 may be applied to the same CSI-RS, which may be referred to as "CSI-RS resource pooling". In other words, the BS may freely select and transmit beamformed CSI-RSs applied with different beam directions within the preconfigured possible transmission instances. However, since this existing mechanism requires reserved resources, e.g., a 5 ms grid, it has a fundamental limitation on improving the resource utilization efficiency of CSI-RS transmissions. This is because the occupied resources regardless of actual CSI-RS transmissions cannot be used for other purposes such as data transmission. If the reserved transmission instances of possible CSI-RS transmissions are not actually often used, such problem of ineffective resource utilization becomes more significant.

Therefore, for more flexible resource usage, dynamic indication of aperiodic CSI-RS may be considered. An aperiodic CSI-RS indication message which may also be associated with aperiodic CSI request is transmitted to the UEs for which this aperiodic transmitted CSI-RS is used for the CSI measurement. In other words, resources are utilized with the indication for the aperiodic CSI-RS, and alternatively, resources without such aperiodic indication may be used for other purposes such as data transmission, resulting in significant CSI-RS overhead reduction. For UEs not indicated to report an aperiodic CSI, this aperiodic CSI-RS indication message may be interpreted as dynamic ZP-CSI-RS indication for those UEs to perform PDSCH rate matching around the indicated resources. Note that this mechanism does not require a certain pre-configured time grid in possible CSI-RS transmission instances, e.g., 5 ms grid, which provides flexibility in resource utilization for BS implementation.

Dynamic Indication of Aperiodic CSI-RS Transmission should be Supported for Effective Resource Utilization In the above case, a UE which does not need to measure an aperiodic CSI-RS may be informed of transmission of the aperiodic CSI-RS through signaling of DCI (e.g., a 1-bit ZP-CSI-RS indicator), and a separate ZP-CSI-RS configuration (assuming aperiodic CSI-RS transmission) configured for the UE through RRC or the like may be selected to cause the UE to perform rate matching. In particular, this operation may be limitedly applied only to a specific TM. For example, a new indicator such as the 1-bit indicator may be configured only for TM9. In the case of TM10, a ZP-CSI-RS, which assumes a time when the aperiodic CSI-RS is transmitted, may be configured through RRC without a separate ZP-CSI-RS configuration, and then may be used through PQI.

In addition, the aperiodic CSI-RS indicator may be used as a resource selector. In this case, the aperiodic CSI-RS indicator may report, to the BS, CSI for the resource or the resource set designated by the indicator CSI among the CSI-RS resources included in the corresponding CSI process (for example, a specific CSI process dynamically indicated through an aperiodic CSI request field that is received together at the same timing point (e.g., SF)). The UE may report the CSI about the best CSI-RS including the CRI (this case may be considered as extension/restriction of CSI-RS resources subject to CRI measurement/reporting), or report the entire CSI about the CSI-RS designated as the resource indicator rather than selecting and reporting the best CRI. The CSI-RS resource set may be configured through higher layer signaling such as RRC signaling.

Figure 14:
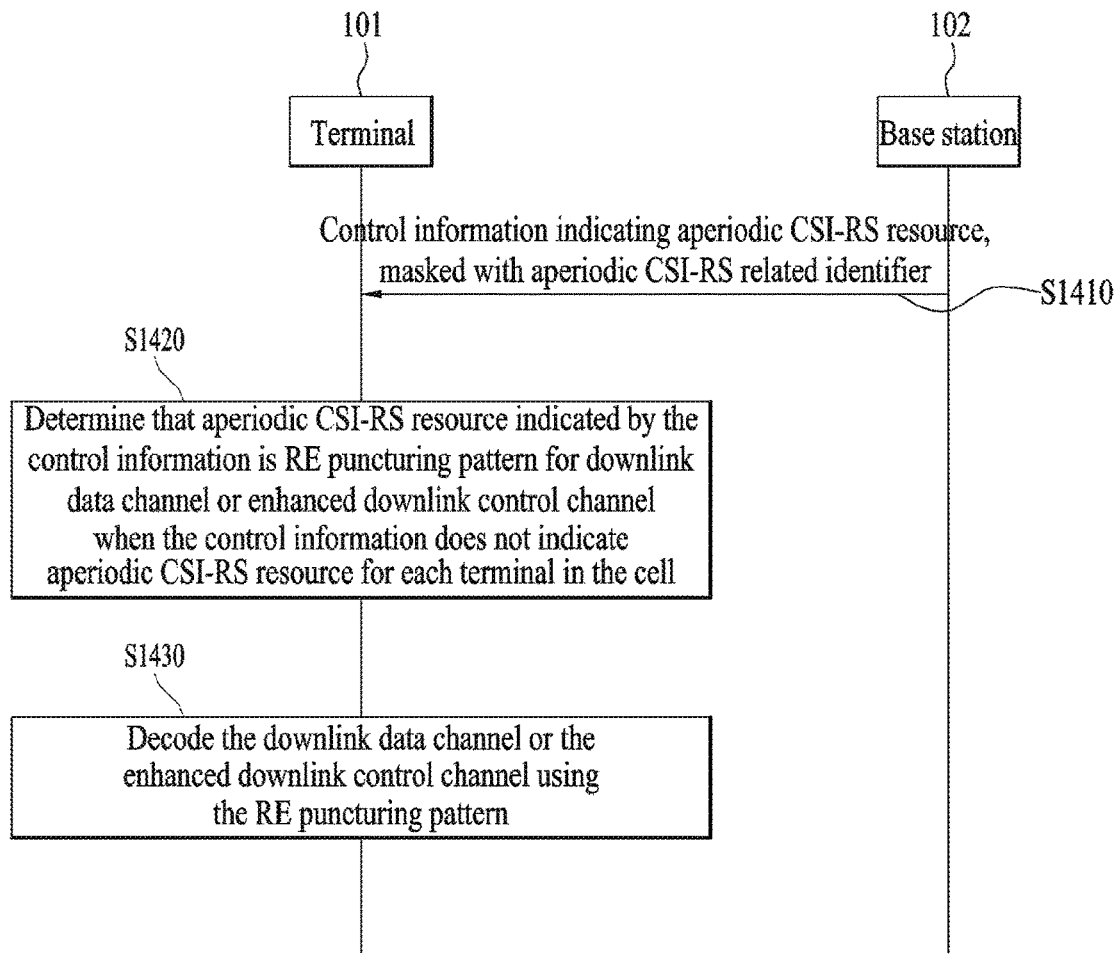
FIG. 14 illustrates an operation according to an embodiment of the present invention.

FIG. 14 illustrates operation according to an embodiment of the present invention.

FIG. 14 relates to a method for receiving a downlink signal in a wireless communication system. The method may be implemented by a UE.

A UE 101 may receive control information indicating an aperiodic CSI-RS resource, masked with an identifier related to an aperiodic channel state information-reference signal (CSI-RS), from a BS 102 (S1410). If the control information does not indicate an aperiodic CSI-RS resource for each UE in the cell, the UE may determine that the aperiodic CSI-RS resource indicated by the control information is a resource element (RE) puncturing pattern for a downlink data channel or an enhanced downlink control channel (S1420).

The UE may decode the downlink data channel or the enhanced downlink control channel using the RE puncturing pattern (S1430).

If the control information does not indicate an aperiodic CSI-RS resource for each UE in the cell, the UE may receive information indicating an aperiodic CSI-RS resource for the UE through separate control information.

If the control information indicates an aperiodic CSI-RS resource for each UE in the cell, the UE may measure the aperiodic CSI-RS on the aperiodic CSI-RS resource for the UE.

In addition, if the control information indicates an aperiodic CSI-RS resource for each UE in the cell, an aperiodic CSI-RS resource for other UEs may be used for rate matching for decoding of the downlink data channel or the enhanced downlink control channel.

In addition, the control information may be received in a UE-specific search space, and/or the control information may be received in a control information candidate of a predetermined minimum aggregation level.

In addition, the control information may be received in downlink control information of a predetermined specific format.

The control information may be received on a downlink control channel except for the enhanced downlink control channel.

The control information may be received on the enhanced downlink control channel.

When the control information is received on the enhanced downlink control channel, the UE may receive information indicating a timing point at which an aperiodic CSI according to the control information is transmitted.

The time (subframe #n+p) at which the aperiodic CSI is transmitted is different from the time (subframe #n+q) at which the aperiodic CSI is transmitted in the case where the control information is received on the downlink control channel, wherein p may be a positive integer greater than q. In addition, the time at which the aperiodic CSI is transmitted may be different from the time at which the uplink data indicated by the control information is transmitted.

The uplink resource through which the aperiodic CSI is transmitted may be predefined.

While the embodiments according to the present invention have been briefly described above with reference to FIG. 14, the embodiment related to FIG. 14 may alternatively or additionally include at least some of the embodiments(s) described above.

Figure 15:
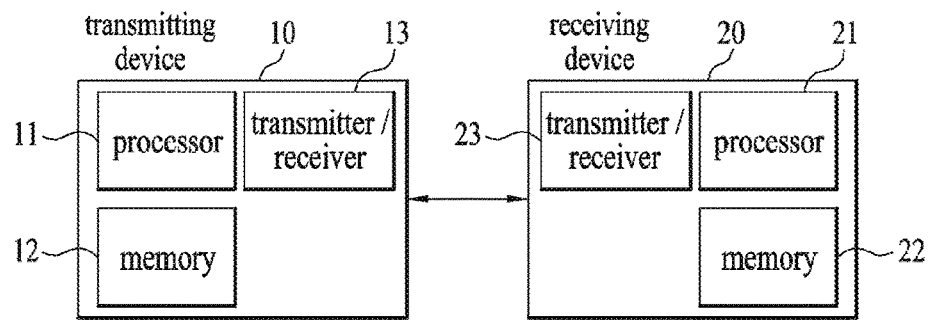
FIG. 15 is a block diagram of devices for implementing embodiment(s) of the present invention.

FIG. 15 is a block diagram of a transmitting device 10 and a receiving device 20 configured to implement exemplary embodiments of the present invention. Referring to FIG. 15, the transmitting device 10 and the receiving device 20 respectively include transmitter/receiver 13 and 23 for transmitting and receiving radio signals carrying information, data, signals, and/or messages, memories 12 and 22 for storing information related to communication in a wireless communication system, and processors 11 and 21 connected operationally to the transmitter/receiver 13 and 23 and the memories 12 and 22 and configured to control the memories 12 and 22 and/or the transmitter/receiver 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the transmitter/receiver 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the transmitter/receiver 13 may include an oscillator. The transmitter/receiver 13 may include Nt (where Nt is a positive integer) transmit antennas.

A signal processing process of the receiving device 20 is the reverse of the signal processing process of the transmitting device 10. Under the control of the processor 21, the transmitter/receiver 23 of the receiving device 10 receives RF signals transmitted by the transmitting device 10. The transmitter/receiver 23 may include Nr receive antennas and frequency down-converts each signal received through receive antennas into a baseband signal. The transmitter/receiver 23 may include an oscillator for frequency down-conversion. The processor 21 decodes and demodulates the radio signals received through the receive antennas and restores data that the transmitting device 10 wishes to transmit.

The transmitter/receiver 13 and 23 include one or more antennas. An antenna performs a function of transmitting signals processed by the transmitter/receiver 13 and 23 to the exterior or receiving radio signals from the exterior to transfer the radio signals to the transmitter/receiver 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An transmitter/receiver supporting a MIMO function of transmitting and receiving data using a plurality of antennas may be connected to two or more antennas.

The transmitting device and/or the receiving device may be configured as a combination of one or more embodiments of the present invention.

The embodiments of the present application has been illustrated based on a wireless communication system, specifically 3GPP LTE (-A), however, the embodiments of the present application can be applied to any wireless communication system in which interferences exist.

It will be apparent to those skilled in the art that various modifications and variations can be made in the present invention without departing from the scope of the invention. Thus, it is intended that the present invention covers the modifications and variations of this invention provided they come within the scope of the appended claims and their equivalents.

INDUSTRIAL APPLICABILITY

The present invention is applicable to wireless communication devices such as a terminal, a relay, and a base station.

What is claimed is:

1. A method for receiving a downlink signal in a wireless communication system, the method being performed by a user equipment (UE), the method comprising:
    receiving at least one of (i) channel state information-reference signal (CSI-RS) indication or (ii) CSI request,
    wherein the CSI-RS indication indicates a CSI-RS configuration, among a plurality of CSI-RS resource configurations;
    wherein the CSI request indicates to report CSI based on the CSI-RS resource configuration;
    based on that the CSI-RS indication and the CSI request are received, reporting CSI based on the CSI-RS resource configuration;
    based on that only the CSI-RS indication is received and the CSI-RS indication does not include information for CSI-RS resource for each UE in a cell, decoding a downlink data channel and an enhanced downlink control channel by puncturing CSI resources included in the plurality of CSI-RS resource configurations; and
    based on that only the CSI-RS indication is received and the CSI-RS indication includes information for CSI-RS resource for each UE in a cell, decoding a downlink data channel and an enhanced downlink control channel by rate matching CSI resources included in the plurality of CSI-RS resource configurations.

2. The method according to claim 1, wherein the CSI-RS indication is received in a UE-specific search space.

3. The method according to claim 1, wherein the CSI-RS indication is received in a control information candidate of a predetermined minimum aggregation level.

4. The method according to claim 1, wherein the CSI-RS indication is received in downlink control information of a predetermined format.

5. The method according to claim 1, wherein the CSI-RS indication is received on the enhanced downlink control channel.

6. A user equipment (UE) configured to receive a downlink signal in a wireless communication system, the UE comprising:

a transmitter and a receiver; and a processor that controls the transmitter and the receiver, wherein the processor:

receives at least one of (i) channel state information-reference signal (CSI-RS) indication or (ii) CSI request, wherein the CSI-RS indication indicates a CSI-RS resource configuration, among a plurality of CSI-RS resource configurations, wherein the CSI request indicates to report CSI based on the CSI-RS resource configuration;

based on that the CSI-RS indication and the CSI request are received, reports CSI based on the CSI-RS resource configuration;

based on that only the CSI-RS indication is received and the CSI-RS indication does not include information for CSI-RS resource for each UE in a cell, decodes a downlink data channel and an enhanced downlink control channel by puncturing CSI resources included in the plurality of CSI-RS resource configurations; and based on that only the CSI-RS indication is received and the CSI-RS indication includes information for CSI-RS resource for each UE in a cell, decodes a downlink data channel and an enhanced downlink control channel by rate matching CSI resources included in the plurality of CSI-RS resource configurations.

* * * * *